(12) United States Patent
Takashima

(10) Patent No.: US 7,729,145 B2
(45) Date of Patent: Jun. 1, 2010

(54) POWER CONVERTER AND METHOD, AND TRIANGLE WAVE GENERATING CIRCUIT

(75) Inventor: Toyotaka Takashima, Hanno (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 124 days.

(21) Appl. No.: 12/281,823

(22) PCT Filed: Mar. 9, 2007

(86) PCT No.: PCT/JP2007/054679

§ 371 (c)(1),
(2), (4) Date: Sep. 5, 2008

(87) PCT Pub. No.: WO2007/102601

PCT Pub. Date: Sep. 13, 2007

(65) Prior Publication Data

US 2009/0073728 A1     Mar. 19, 2009

(30) Foreign Application Priority Data

Mar. 9, 2006   (JP) .............................. 2006-064150

(51) Int. Cl.
*H02M 5/42* (2006.01)
*H02M 7/155* (2006.01)

(52) U.S. Cl. ........................... 363/87; 363/85; 363/128; 363/129

(58) Field of Classification Search ................... 363/54, 363/128, 129, 87, 85
See application file for complete search history.

(56) References Cited

U.S. PATENT DOCUMENTS 4,965,860 A * 10/1990 Jochi .......................... 219/113

FOREIGN PATENT DOCUMENTS

| JP | 61-214770 | 9/1986 |
| JP | 5-56645 | 3/1993 |
| JP | 8-214599 | 8/1996 |
| JP | 9-285127 | 10/1997 |
| JP | 10-52045 | 2/1998 |
| JP | 11-41936 | 2/1999 |
| JP | 11-150954 | 6/1999 |

OTHER PUBLICATIONS

International Search Report for PCT/JP2007/054679, mailed Apr. 24, 2007.

* cited by examiner

*Primary Examiner*—Shawn Riley
(74) *Attorney, Agent, or Firm*—Nixon & Vanderhye P.C.

(57) ABSTRACT

A power converter that converts an AC power outputted from a generator into a DC power and supplies it to a battery (load). The power converter includes a thyristor (switch unit) connected between an output unit of the generator and the battery (load); and a gate control unit (control unit) for generating a triangle wave voltage having a constant peak voltage corresponding to each cycle of the AC power outputted from the generator, generating a differential voltage between the voltage supplied to the load via the switch unit and a predetermined target voltage, and controlling the conductive state of the switch unit based on the triangle wave voltage and the differential voltage.

13 Claims, 28 Drawing Sheets

US 7,729,145 B2

POWER CONVERTER AND METHOD, AND TRIANGLE WAVE GENERATING CIRCUIT

This application is the U.S. national phase of International Application No. PCT/JP2007/054679, filed 9 Mar. 2007, which designated the U.S. and claims priority to Japan Application Nos. 2006-064150, filed 9 Mar. 2006, the entire contents of each of which are hereby incorporated by reference.

TECHNICAL FIELD

The present invention relates to a power converter and method that convert an AC power outputted from a generator to a DC power, and a Triangle wave generating circuit, and particularly relates to a technique for precisely controlling an output voltage according to a target voltage.

BACKGROUND ART

Conventionally, a power converter that adjusts an AC power outputted from a generator and converts it to a DC power is used for, for example, charging a battery of a vehicle.

FIG. 34 is a configuration of a conventional power converter 200. In FIG. 34, an AC power is fed to a generator coil 100 by driving a rotation axis of the generator. A thyristor 201, a resistor 202, a diode 203, Zener diodes 204 and 205, and a diode 206 constitute the power converter 200, being basically realized as a half-wave rectifier circuit.

Specifically, an anode of the thyristor 201 is connected to one end of the generator coil 100, and a cathode thereof is connected to a positive electrode of a battery 300 that forms a load of the power converter 200. The resistor 202, the diode 203, and the Zener diodes 204 and 205 are connected in series in that order between the anode and the ground of the thyristor 201. From the anode of the thyristor 201 toward the ground, the diode 203 is connected in the forward direction, and the Zener diodes 204 and 205 are connected in the reverse direction. The diode 206 is connected in the forward direction from a connection point P between the resistor 202 and the diode 203 toward a gate electrode of the thyristor 201.

A voltage Vref at the connection point P is set such that the thyristor 201 is controlled to an ON state when a terminal voltage of the battery 300 is below a target voltage VT, which is higher than a stipulated voltage of the battery 300 by a predetermined voltage. In other words, the voltage Vref is set at an appropriate value such that the thyristor 201 does not attain the ON state when the terminal voltage of the battery 300 is equal to or greater than the target voltage VT.

A power converter according to the abovementioned conventional technique will be explained using FIG. 35.

FIG. 35A is a diagram of an operation where a generator has a low number of rotations, and FIG. 35B, an operation where the generator has a high number of rotations. For sake of convenience, an initial value of the terminal voltage of the battery 300 is lower than the target voltage VT.

In a period T1 in FIG. 35A, when a positive phase (positive voltage) of an AC voltage VA fed to the generator coil 100 is supplied to the anode of the thyristor 201, the AC voltage VA is applied via the resistor 202 to the connection point P. When the voltage at the connection point P increases, current flows to the gate electrode of the thyristor 201 via the diode 206, and the thyristor 201 turns ON. Thereafter, the Zener diodes 204 and 205 clamp the voltage at the connection point P to the voltage Vref. When the thyristor 201 turns ON, the positive phase of the AC voltage VA is supplied via the thyristor 201, whereby the output voltage VO of the thyristor 201 increases, charging the battery 300.

In a subsequent period T2, when the AC voltage VA shifts to the negative phase (negative electrode), the voltage at the connection point P decreases, whereby the thyristor 201 switches to a reverse-bias state and turns OFF. When the thyristor 201 turns OFF, since power is no longer supplied to the battery 300, the battery 300 discharges and its terminal voltage gradually decreases.

In a subsequent period T3, when the AC voltage VA shifts again to the positive phase, the voltage at the connection point P increases; however, since the terminal voltage of the battery 300 (i.e. the output voltage VO of the thyristor 201) is still higher than the target voltage VT, current does not flow to the gate electrode of the thyristor 201, which remains OFF. The thyristor 201 remains OFF in subsequent periods T4 to T6, since the output voltage VO is still higher than the target voltage VT.

During a subsequent period T7, when the output voltage VO drops below the target voltage VT, the thyristor 201 turns ON and the output voltage VO is slightly increased by the positive phase of the AC voltage VA being outputted from the generator at that time, charging the battery 300.

While, in a subsequent period T8, when the AC voltage VA shifts to negative phase, the thyristor 201 turns OFF and the output voltage VO decreases, in a subsequent period T9, when the output voltage VO drops below the target voltage VT, the thyristor 201 turns ON, and output voltage VO is increased by the positive phase of the AC voltage VA being outputted from the generator at that time.

Thus, when the output voltage VO drops below the target voltage VT, the thyristor 201 turns ON and charges the battery 300 during the positive phase of the AC voltage VA.

As shown in FIG. 35B, when the generator has a high number of rotations, the amplitude of the AC voltage VA outputted from the generator increases and so does its frequency, thereby increasing the rise rate of the output voltage VO, but it is otherwise identical to the example of FIG. 35A.

Patent Literature: JPA No. Hei 10-52045.

DISCLOSURE OF THE INVENTION

Problems to be Solved by the Invention

According to the conventional technique described above, when the output voltage VO has dropped below the target voltage VT, the thyristor 201 is turned ON during the positive phase cycle period of the AC voltage VA. If the output voltage VO does not drop below the target voltage VT, the thyristor 201 remains OFF in each cycle period.

Thus, in each cycle period of the AC voltage VA, the thyristor 201 is controlled to one of the extreme binary states of being conductive or nonconductive. This conventional technique is therefore problematic in that the fluctuating amplitude of the output voltage VO increases, and it becomes difficult to precisely control the output voltage VO to the target voltage VT.

Also, the configuration of the conventional technique shown in FIG. 34 is problematic in that, when a lamp is connected as the load instead of the battery 300, the effective value Vrms of the output voltage increases and the lamp switches off.

FIG. 36 is a power converter that solves such problems. In comparison with the device configuration shown in FIG. 34, this power converter further includes a circuit system for obtaining an effective value Vrms of the output voltage VO, including a transistor 401, a diode 402, a Zener diode 403, a resistor 404, and an electrolytic capacitor 405.

According to this device, the output voltage VO is supplied to the electrolytic capacitor 405 and smoothed by it; in addition, when the terminal voltage of the electrolytic capacitor 405 increases, the transistor 401 becomes conductive and forcibly turns the thyristor 201 OFF, suppressing the increase in the terminal voltage of the electrolytic capacitor 405. Therefore this device is problematic in that, while the effective value Vrms of the output voltage is supplied to a lamp 301, which consequently does not switch off, since the output voltage VO is outputted discretely, the lamp blinks and flickers.

According to the conventional techniques shown in FIG. 34 and FIG. 36, since the peak voltage of the output voltage VO increases, an electronic device with a restricted rated supply voltage cannot be connected as the load. FIG. 37 is a power converter that solves this problem. In comparison with the configuration of FIG. 34, this power converter further includes a circuit system for suppressing the peak voltage of the output voltage VO, including a thyristor 500 for short-circuiting the generator coil 100, and a diode 501 and a Zener diode 502 for controlling the thyristor 500.

According to this conventional device, when the output voltage VO exceeds a fixed voltage determined by the Zener diode 502, the thyristor 500 turns ON and the output of the generator is short-circuited to ground, whereby the amplitude of the AC voltage VA is controlled, and the peak of the output voltage VO of the thyristor 201 can be suppressed.

However, this conventional device is problematic in that, since the effective value Vrms is low, an electronic device connected as a load does not operate. There is a further problem that, since the output of the generator is short-circuited to ground, the power conversion efficiency deteriorates.

The present invention has been realized in view of the above, and aims to provide a power converter and method, and a triangle wave generating circuit, that can precisely control the output voltage to the target voltage without reducing the power conversion efficiency.

Means for Solving the Problems

To solve these problems, a power converter according to the invention converts an AC power outputted from a generator into a DC power and supplies it to a load, and includes a switch unit connected between an output unit of the generator and the load, and a control unit for generating a triangle wave voltage having a constant peak voltage corresponding to each cycle of the AC power outputted from the generator, generating a differential voltage between the voltage supplied to the load via the switch unit and a predetermined target voltage, and controlling the conductive state of the switch unit based on the triangle wave voltage and the differential voltage.

In the above power converter, the control unit includes a differential circuit that inputs the voltage supplied to the load via the switch unit and the predetermined target voltage, and generates a differential voltage between them, and a comparing circuit that compares the differential voltage generated by the differential circuit, and, based on the comparison result, generates a pulse signal that stipulates a conduction timing of the switch unit and supplies it to the switch unit.

In the above power converter, the control unit includes a voltage generating circuit that generates a predetermined voltage, and a selection circuit that, based on the size relationship between a predetermined voltage generated by the voltage generating circuit and a differential voltage generated by the differential circuit, selects one of the predetermined voltage and the differential voltage, and outputs it to the comparing circuit, and the comparing circuit compares the predetermined voltage or the differential voltage inputted from the selection circuit with the triangle wave voltage, and, based on the comparison result, generates a pulse signal that stipulates a conduction timing of the switch unit, and supplies it to the switch unit.

In the above power converter, the control unit includes a counter circuit that counts a clock, and, when the count result exceeds a threshold, controls the output of the selection circuit such that it outputs the differential voltage generated by the differential circuit.

In the above power converter, the voltage generating circuit includes a CR circuit including a capacitor and a resistor, and generates the predetermined voltage by discharging a charge stored in the capacitor.

In each of the above power converters, the control unit includes a load removal detection circuit that detects a removal of the load based on the AC voltage outputted from the generator and the output of the switch unit, and, when it detects that the load has been removed, controls the output of the selection unit such that it outputs the predetermined voltage generated by the voltage generating circuit.

In each of the above power converters, the control unit includes a load removal detection circuit that detects a removal of the load based on the AC voltage outputted from the generator and the output of the switch unit, and, when it detects that the load has been removed, performs a process for reducing the voltage value of the predetermined target voltage.

The above power converter further includes an amplifying circuit that amplifies the differential voltage and supplies it to the comparing circuit.

In the above power converter, if H is the wave height value of the triangle wave, M is the amplification rate of the amplifying circuit, VT is the target voltage, and W is the control width of the voltage supplied via the switch unit to the load, then W is a value within a range from VT to VT+(H/M).

In the above power converter, the control unit includes, as means for generating said triangle wave voltage, a count unit that counts the time of a half-cycle of an AC voltage VA in a first cycle outputted by the generator, a division unit that divides a count number of the count unit by a predetermined value, and a waveform generation unit that, in a second cycle after the first cycle, generates a step voltage waveform that rises by the predetermined voltage at each elapse of a time indicated by the division result obtained from the division unit in the first cycle, the step voltage waveform being outputted as a waveform of the triangle wave voltage.

In the above power converter, the control unit includes a first charge unit that charges a first capacitor with a constant current having a predetermined current value, while the AC voltage outputted from the generator is in a positive cycle or a negative cycle, a second charge unit that charges a second capacitor with a constant current having a current value based on a voltage between the terminals of the first capacitor when the cycle ends, and a control unit that terminates charging of the second charge unit, based on the AC voltage cycle and the voltage between the terminals of the second capacitor, the power converter further including a triangle wave generating circuit that outputs the voltage between the terminals of the second capacitor as a waveform of the triangle wave voltage.

A power converter according to one aspect of the present invention converts a triple-phase AC power outputted from a generator into a DC power and supplies it to a load, and includes a plurality of switch units connected between each phase output unit of the generator and each terminal of the load, and a control unit for generating a triangle wave voltage corresponding to each cycle of the AC power in each phase outputted from the generator and having a constant peak voltage, generating a differential voltage between the voltage supplied to the load via the switch unit and a predetermined target voltage, and, in each phase, controlling the conductive state of each switch unit connected to that phase output unit, based on the triangle wave voltages generated for other phases and the differential voltage.

In the above power converter, the control unit generates a W-phase triangle wave voltage corresponding to each cycle of a W-phase AC power outputted from the generator and having a constant peak voltage, generates a differential voltage between the voltage supplied to the load via the switch unit and a predetermined target voltage, and, in each phase, controls the conductive state of each switch unit connected to a U-phase output unit, based on the generated W-phase triangle wave voltages and the differential voltage, generates a U-phase triangle wave voltage corresponding to each cycle of a U-phase AC power outputted from the generator and having a constant peak voltage, generates a differential voltage between the voltage supplied to the load via the switch unit and a predetermined target voltage, and, in each phase, controls the conductive state of each switch unit connected to a V-phase output unit, based on the generated U-phase triangle wave voltages and the differential voltage, and generates a V-phase triangle wave voltage corresponding to each cycle of a V-phase AC power outputted from the generator and having a constant peak voltage, generates a differential voltage between the voltage supplied to the load via the switch unit and a predetermined target voltage, and, in each phase, controls the conductive state of each switch unit connected to a W-phase output unit, based on the generated V-phase triangle wave voltages and the differential voltage.

To solve the problems described above, a power conversion method according to the invention includes a step of supplying an AC power outputted from a generator via a switch unit connected between an output unit of the generator and a load, to the load, a step of generating a triangle wave voltage having a constant peak voltage corresponding to each cycle of the AC power outputted from the generator, a step of generating a differential voltage between the voltage supplied to the load via the switch unit and a predetermined target voltage, and a step of controlling the conductive state of the switch unit based on the triangle wave voltage and the differential voltage.

A triangle wave generating circuit according to the invention generates a triangle wave voltage for controlling the conductive state of a switch element in a power converter that converts an AC power outputted from a generator into a DC power and supplies it to a load, and includes a count unit that counts the time of a half-cycle of an AC voltage VA in a first cycle outputted by the generator, a division unit that divides a count number of the count unit by a predetermined value, and a waveform generation unit that, in a second cycle after the first cycle, generates a step voltage waveform that rises by the predetermined voltage at each elapse of a time indicated by the division result obtained from the division unit in the first cycle, and outputs the step voltage waveform as a waveform of the triangle wave voltage.

A triangle wave generating circuit according to one aspect of the invention generates a triangle wave voltage for controlling the conductive state of a switch element in a power converter that converts an AC power outputted from a generator into a DC power and supplies it to a load, and includes a first charge unit that charges a first capacitor with a constant current having a predetermined current value, while the AC voltage outputted from the generator is in a positive cycle or a negative cycle, a second charge unit that charges a second capacitor with a constant current having a current value based on a voltage between the terminals of the first capacitor when the cycle ends, and a control unit that terminates charging of the second charge unit, based on the AC voltage cycle and the voltage between the terminals of the second capacitor, the triangle wave generating circuit outputting the voltage between the terminals of the second capacitor as a waveform of the triangle wave voltage.

EFFECTS OF THE INVENTION

According to the invention, since the conductive timing of the thyristor is controlled in accordance with the differential voltage between the output voltage and the target voltage, the output voltage can be precisely controlled to the target voltage without reducing the power conversion efficiency.

Figure 1:
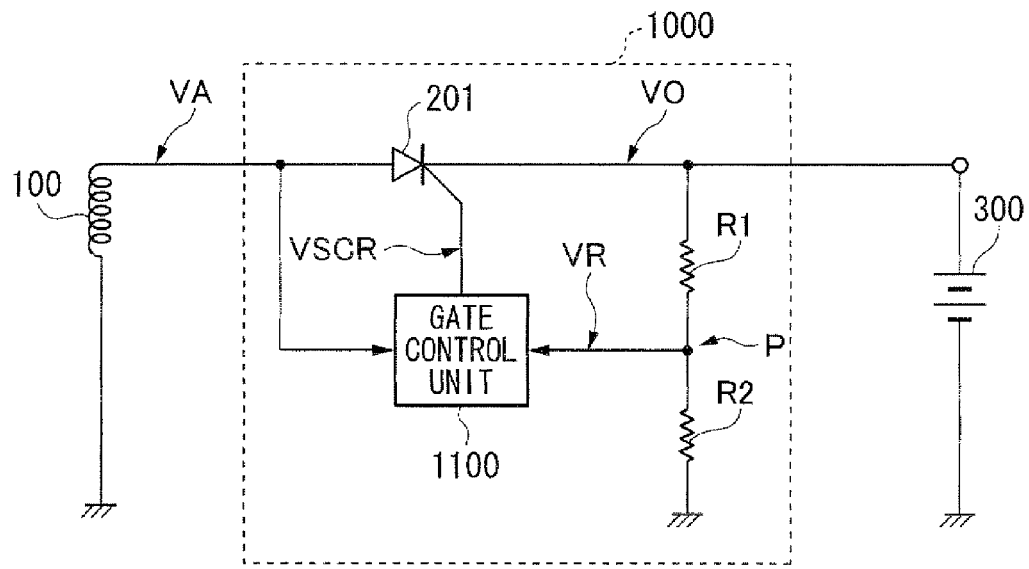
FIG. 1 is a diagram of a configuration and an application example of a power converter according to a first embodiment of the invention.

REFERENCE NUMERALS 100 coil, 201, 2071, 2073 thyristor, 300 battery, 100, 2070, 2080, 2090, 2100, 2110, 2120, 2130, 2140, 2150 power converter, 110, 2072, 2152 gate control unit, 1110 voltage conversion circuit, 1120, 1121 reference voltage generating circuit, 1130 differential circuit, 1140 amplifying circuit, 1150, 1151, 1152 triangle wave generating circuit, 1160, 1210 comparing circuit, 1220, 1221 limit voltage generating circuit, 1230 switch circuit, 1240 start circuit, 1250 counter circuit, 1260, 11210 battery removal detection circuit, 11211 selection unit, 11212 1.5V voltage source, 11223 2.5V voltage source 11223, 11500 constant current source, 11502 constant current source, 11501 hold circuit, 11503 control unit, C1, C2 capacitor, I1, I2, I3 inverter, Q1, Q2, Q3, Q4, Q5, Q6 power MOSFET, R1, R2 resistor, SW1, SW2, SW3, SW4 switch.

BEST MODES FOR CARRYING OUT THE INVENTION

Embodiments of the invention will be explained with reference to the drawings.

First Embodiment

Figure 34:
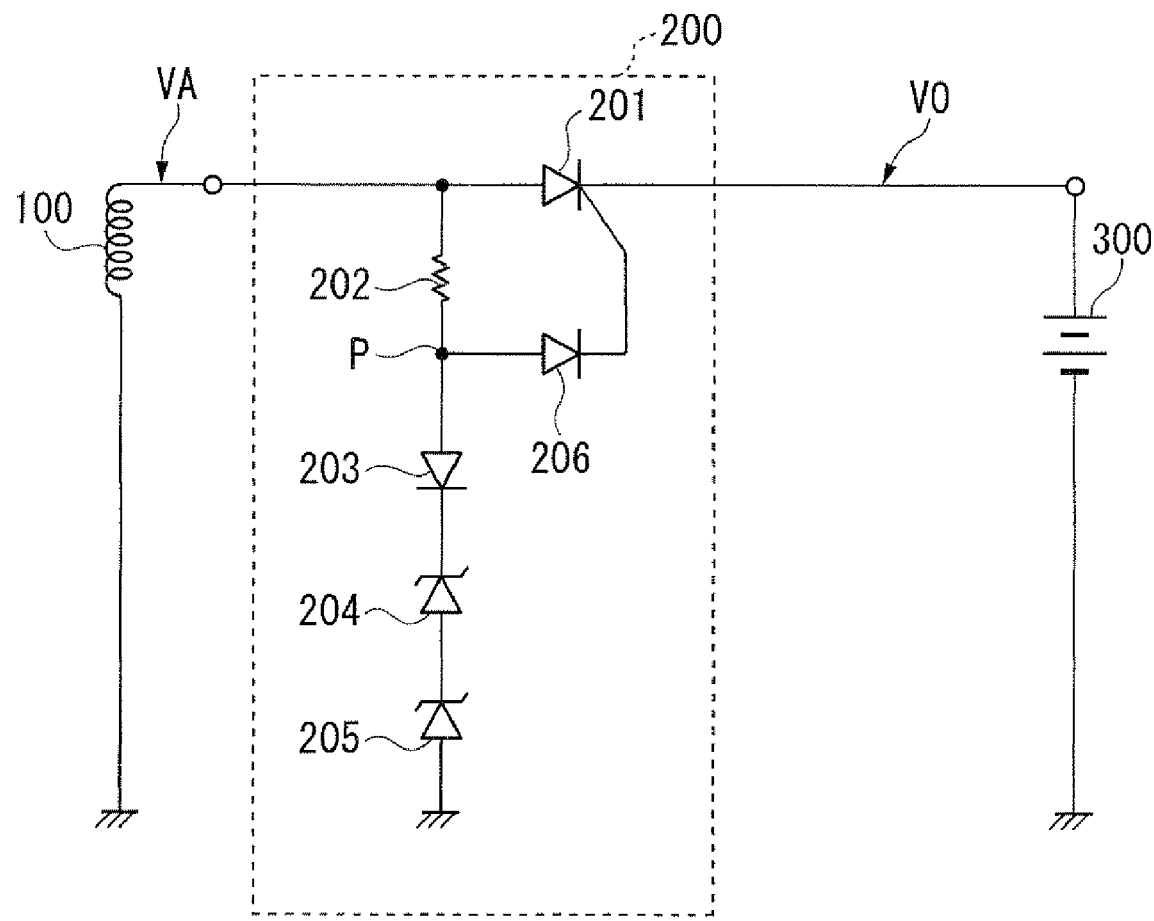
FIG. 34 is a diagram of the configuration of a conventional power converter (having a battery as a load).
Figure 35A:
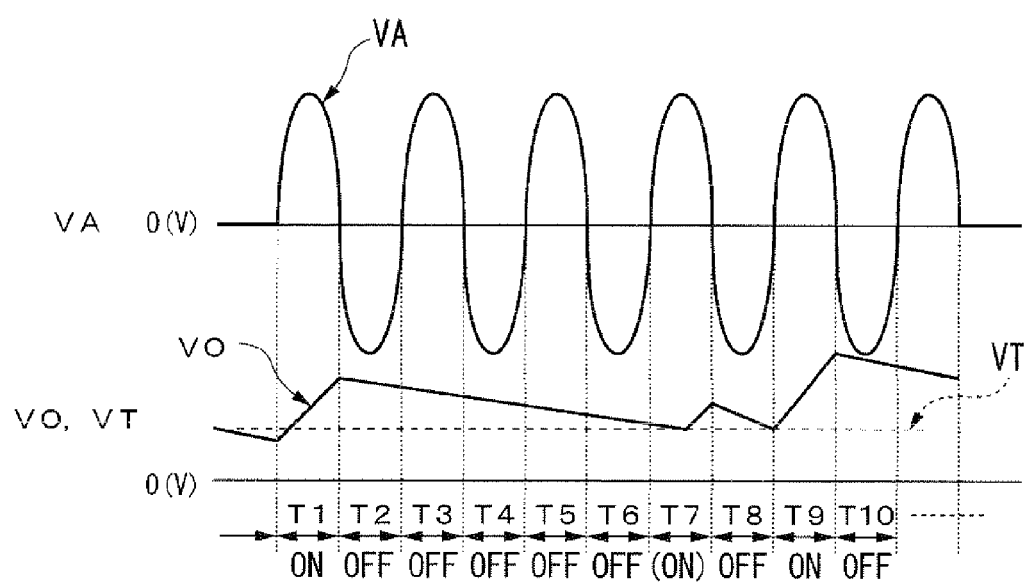
FIG. 35A is a waveform chart for explanation of an operation of a conventional power converter.
Figure 35B:
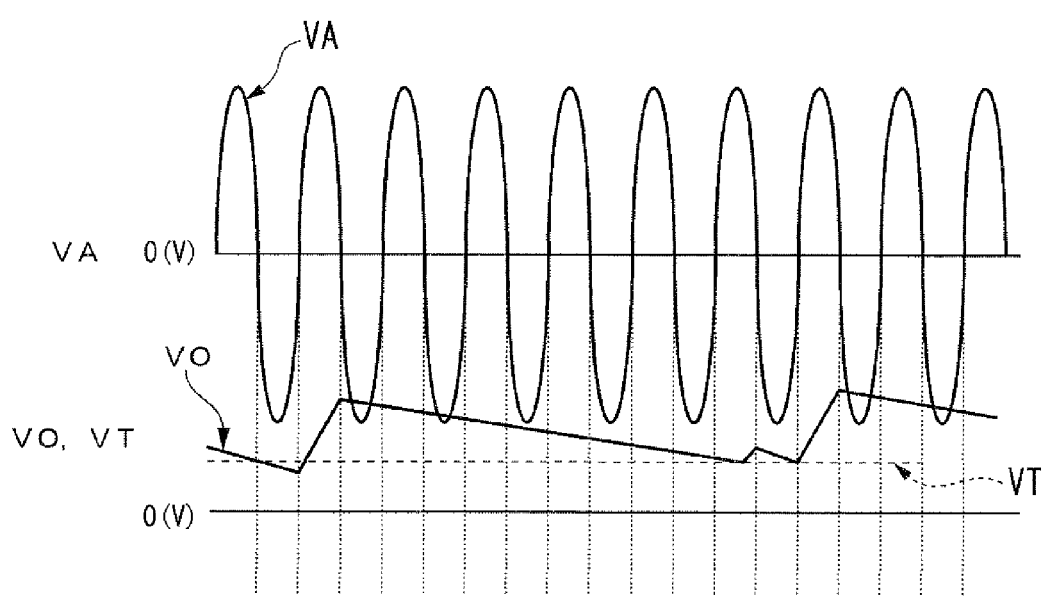
FIG. 35B is a waveform chart for explanation of an operation of a conventional power converter.
Figure 36:
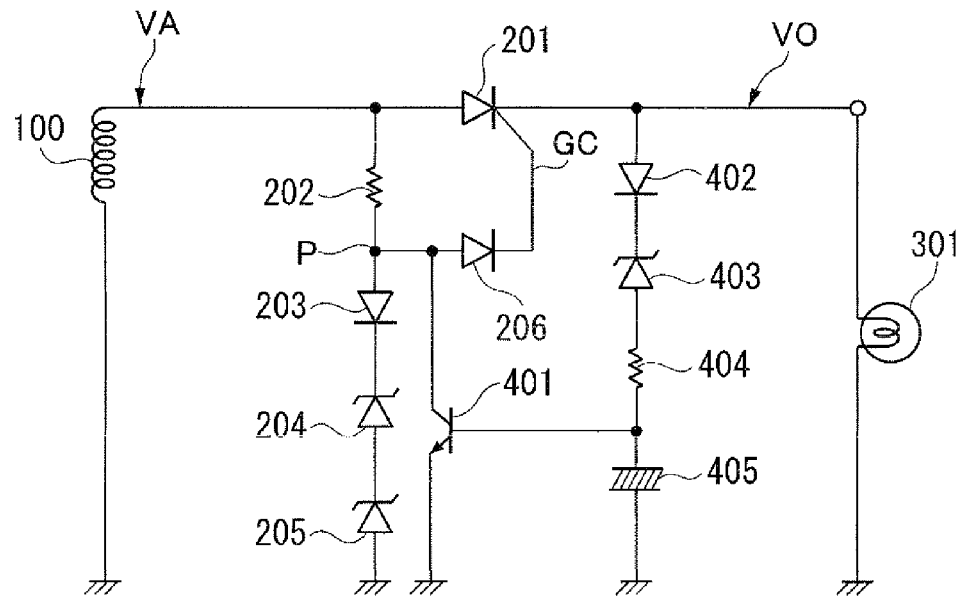
FIG. 36 is a diagram of the configuration of a conventional power converter (having a lamp as a load).
Figure 37:
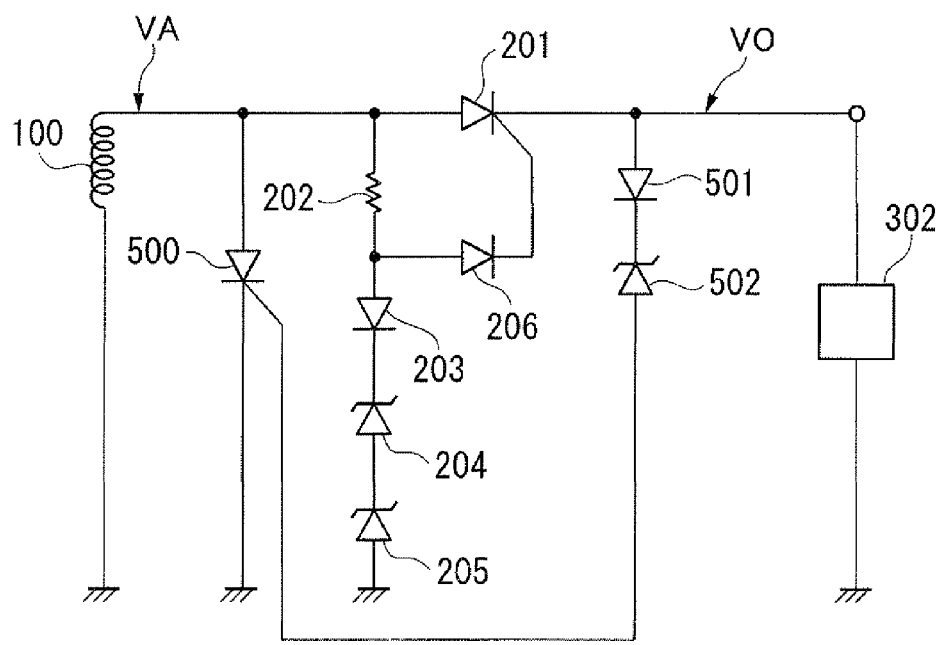
FIG. 37 is a diagram of the configuration of a conventional power converter (having an electronic device as a load).

FIG. 1 is a configuration of a power converter 1000 according to this embodiment of the invention. In FIG. 1, constituent parts which are common with those of the conventional device shown in FIG. 34 are designated with like reference numerals.

The power converter 1000 converts an AC voltage VA outputted from a generator coil 100 to an output voltage VO, and supplies it to a battery 300 constituting a load; the power converter 1000 includes a thyristor 201, a gate control unit 1100, and resistors R1 and R2. The thyristor 201 is connected between an output unit of the generator and the battery 300. Specifically, an anode of the thyristor 201 is connected to one end of the generator coil 100, and the battery 300 is connected to a positive electrode of a cathode of the thyristor 201. A negative electrode of the battery 300 connects to ground.

The resistors R1 and R2 for detecting an output voltage VO supplied via the thyristor 201 to the positive electrode of the battery 300 are connected in series between the cathode of the thyristor 201 and ground, and a voltage VR, obtained when the output voltage VO is divided by these resistors, appears at a connection point P between the resistors R1 and R2. An input unit of the gate control unit 1100 is connected to the connection point P, and an output unit of the gate control unit 1100 is connected to a gate electrode of the thyristor 201.

Figure 2:
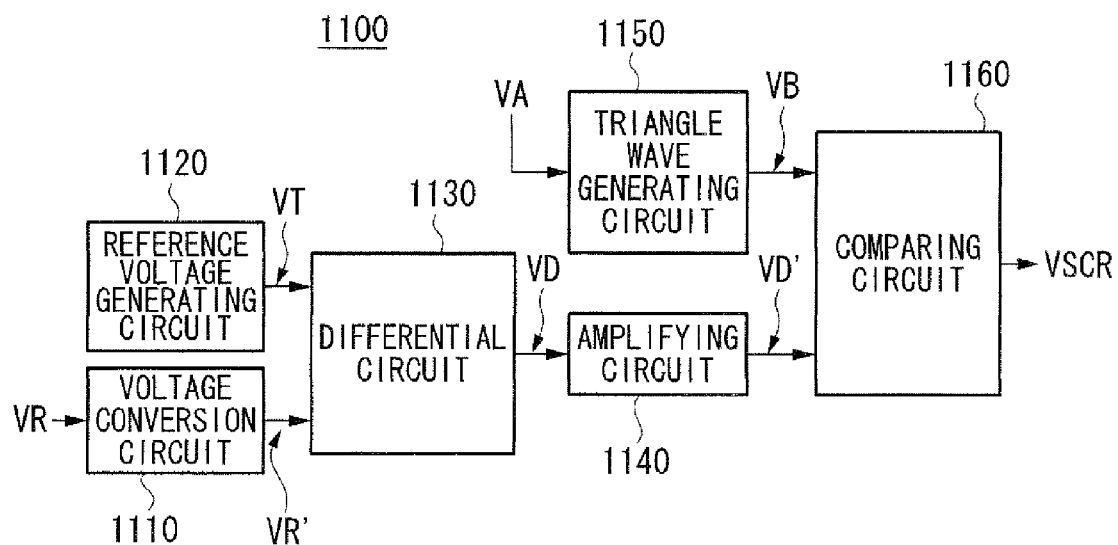
FIG. 2 is a block diagram of a detailed configuration of a gate control unit according to the first embodiment of the invention.

FIG. 2 is a detailed configuration of the gate control unit 1100.

The gate control unit 1100 controls the conduction of the thyristor 201, and includes a voltage conversion circuit 1110, a reference voltage generating circuit 1120, a differential circuit 1130, an amplifying circuit 1140, a triangle wave generating circuit 1150, and a comparing circuit 1160. The voltage conversion circuit 1110 converts the voltage VR appearing at the connection point P to a voltage VR' that expresses its effective value or average value; an input unit of the voltage conversion circuit 1110 connects to the connection point P, and an output unit connects to one input unit of the differential circuit 1130. The voltage VR' corresponds to the output voltage VO supplied to the battery 300, and is treated as a detection value of the output voltage VO.

The matter of whether the voltage VR' expresses the effective value or average value of the voltage VR is determined as appropriate beforehand according to how the device is being used. If the device is used such that the effective value of the output voltage VO has significance, the voltage conversion circuit 1110 outputs the effective value of the voltage VR, whereas, if the average value of the output voltage VO is significant, the voltage conversion circuit 1110 outputs an average value of the voltage VR. Of course, the voltage VR can be output unchanged as voltage VR', and can be converted to an amount other than the effective and average values. Conventional technology can be used to generate the effective and average values of the voltage VR.

The reference voltage generating circuit 1120 generates a target voltage VT for charging the battery 300, and its output unit is connected to another input unit of the differential circuit 1130. The significance of this target voltage VT has already been explained. The differential circuit 1130 generates a differential voltage VD (=VR'−VT) of the voltage VR' and the target voltage VT, and its output unit is connected to an input unit of the amplifying circuit 1140.

The amplifying circuit 1140 multiplies the differential voltage VD by a magnification coefficient (amplification factor) M (>0), and outputs a differential voltage VD' that is an amplification of the differential voltage VD by M times; an output unit of the amplifying circuit 1140 connects to one input unit of the comparing circuit 1160. The triangle wave generating circuit 1150 generates a triangle wave voltage VB corresponding to each cycle of the AC voltage VA outputted from the generator coil 100, and its output unit connects to another input unit of the comparing circuit 1160.

In this embodiment of the invention, as shown in FIG. 3, the triangle wave voltage VB corresponds to a cycle period of the positive phase of the AC voltage VA, and has a waveform that increases at a constant gradient from 0V from a basic point when the AC voltage VA changes from negative to positive, and becomes 0V when the AC voltage VA changes from positive to negative. The peak voltage Vp of the triangle wave voltage VB in each cycle period is constant. The mechanism for generating this triangle wave voltage VB will be explained later.

The comparing circuit 1160 compares the triangle wave voltage VB with the differential voltage VD', and outputs a pulse signal VSCR whose level corresponds to the size relationship between them. In this embodiment, the pulse signal VSCR is at the high level in intervals when the triangle wave voltage VB is larger than the differential voltage VD', and is otherwise at the low level. The pulse signal VSCR is supplied to the gate electrode of the thyristor 201.

Subsequently, an operation of the power converter 1000 will be explained with reference to FIGS. 3 to 6.

Figure 3A:
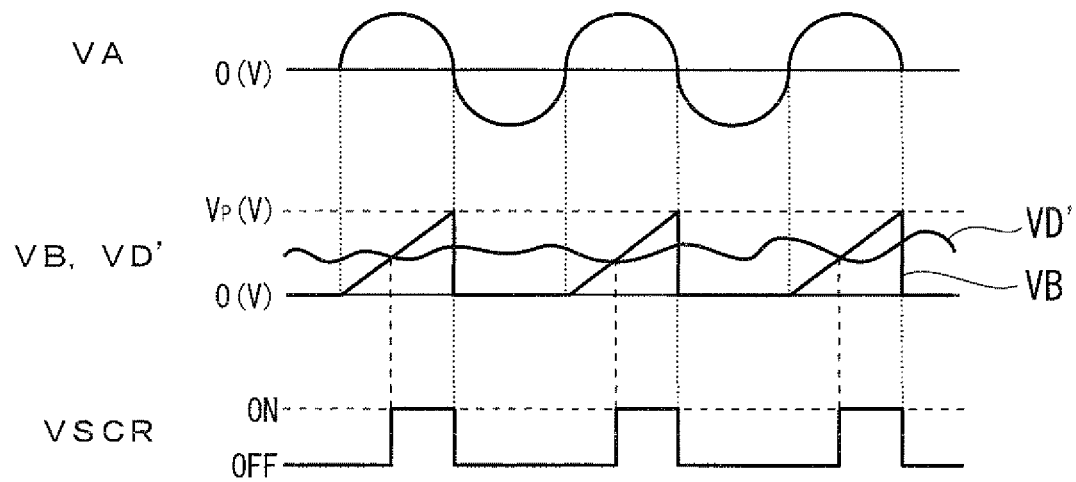
FIG. 3A is a waveform chart for explanation of an operation of a power converter according to the first embodiment of the invention, being a waveform chart of when a generator has a low number of rotations.
Figure 3B:
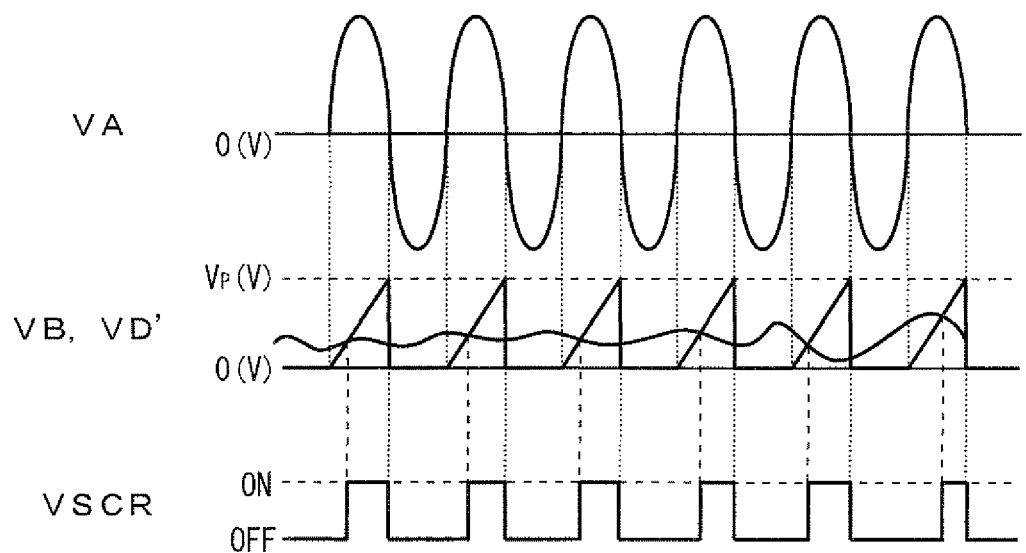
FIG. 3B is a waveform chart for explanation of an operation of a power converter according to the first embodiment of the invention, being a waveform chart of when a generator has a high number of rotations.

FIG. 3A is an example where the generator has a low number of rotations, and FIG. 3B is an example where the generator has a high number of rotations, the rotation of the generator being stationary in an initial state, and explained sequentially from this initial state.

If the rotation of the generator is stationary, since power is not generated in the generator coil 100, the AC voltage VA is 0V and the power converter 1000 is in a state of no power being supplied. When the load is not a battery (e.g. when the load is a lamp), the voltage VR at the connection point P at this time is also 0V, whereby the differential voltage VD and the differential voltage VD' have negative values. Therefore, in the initial state, the triangle wave voltage VB is higher than the differential voltage VD', and the comparing circuit 1160 sends the pulse signal VSCR at the high level to the gate of the thyristor 201. When the load is a battery, since the positive phase of the AC voltage VA is not supplied, the voltage VR at the connection point P is low and the triangle wave voltage VB is similarly higher than the differential voltage VD', and the comparing circuit 1160 sends the pulse signal VSCR at the high level to the gate of the thyristor 201.

When the generator starts to generate power from this initial state, the AC voltage VA outputted from the generator is supplied as an output voltage VO via the thyristor 201 which is ON to the battery 300, and the battery 300 starts charging. When the generator outputs the AC voltage VA, the triangle wave generating circuit 1150 generates a triangle wave voltage VB for each cycle of the AC voltage VA.

As the output voltage VO increases, so does the voltage VR at the connection point P. As the voltage VR increases, so does the voltage VR' outputted by the voltage conversion circuit 1110. The differential circuit 1130 inputs a target voltage VT generated by the reference voltage generating circuit 1120 and the voltage VR' outputted from the voltage conversion circuit 1110, and outputs their differential voltage VD. The amplifying circuit 1140 amplifies the differential voltage VD by M times, and supplies a differential voltage VD' (=M×VD) to the comparing circuit 1160.

When the voltage VR' exceeds the target voltage VT, the differential voltage VD outputted from the differential circuit 1130 shifts to a positive value, and so does the differential voltage VD' of the amplifying circuit 1140 that inputs the differential voltage VD. The significance of using the amplifying circuit 1140 to amplify the differential voltage VD by M times will be explained later. As shown in FIG. 3A, the result of the differential voltage VD' shifting to a positive value is that the waveform of the differential voltage VD' intersects the waveform of the triangle wave voltage VB, generating an interval where the triangle wave voltage VB is higher than the differential voltage VD', and an interval when the triangle wave voltage VB is lower than the differential voltage VD'.

The comparing circuit 1160 compares the differential voltage VD' with the triangle wave voltage VB, and, based on the result of this comparison, generates a pulse signal VSCR that stipulates a conduction timing of the thyristor 201. The comparing circuit 1160 supplies the pulse signal VSCR to the gate electrode of the thyristor 201 at the high level in an interval when the triangle wave voltage VB is higher than the differential voltage VD', and at the low level in an interval when the triangle wave voltage VB is lower than the differential voltage VD'.

The gate electrode of the thyristor 201 inputs the pulse signal VSCR, and the thyristor 201 turns ON when the pulse signal VSCR shifts to the high level. When the AC voltage VA shifts to a negative voltage as the pulse signal VSCR drops to the low level, the thyristor 201 switches to a reverse-bias state and turns OFF. That is, the thyristor 201 turns ON in an interval when the triangle wave voltage VB is higher than the differential voltage VD', and turns OFF in all other intervals. Thus the voltage conversion circuit 1110 controls the conductive state of the thyristor 201 based on the triangle wave voltage VB generated by the triangle wave generating circuit 1150, and the differential voltage VD' outputted from the amplifying circuit 1140.

The interval when the thyristor 201 is ON, i.e. the period when the triangle wave voltage VB is higher than the differential voltage VD', is dependent on the level of the differential voltage VD', which is dependent on the level of the output voltage VO with respect to the target voltage VT. Therefore, if the output voltage VO is higher, the level of the differential voltage VD' is also high, whereby the periods when the triangle wave voltage VB is higher than the differential voltage VD' decrease, and so do the periods when the thyristor 201 is ON. As a result, the output voltage VO decreases toward the target voltage VT.

Conversely, if the output voltage VO is lower, the level of the differential voltage VD' is also low, whereby the periods when the triangle wave voltage VB is higher than the differential voltage VD' increase, and so do the periods when the thyristor 201 is ON. As a result, the output voltage VO increases toward the target voltage VT. Thus in each cycle of the AC voltage VA of the generator, the conduction period of the thyristor 201 is controlled such that the output voltage VO is stable at the target voltage VT.

While the above example describes a case where the generator has a low number of rotations, when the generator has a high number of rotations, as shown in FIG. 3B, as the amplitude of the AC voltage VA outputted by the generator increases, so does the frequency, and, although the rise rate of the triangle wave voltage VB increases, the operation is otherwise the same as when the generator has a high number of rotations as shown in FIG. 3A, the thyristor 201 being gate-controlled such that the output voltage VO is stable at the target voltage VT.

Subsequently, a mechanism for generating the triangle wave voltage VB in the triangle wave generating circuit 1150 will be explained with reference to FIGS. 4 and 5.

Since the frequency of an AC voltage outputted from a generator does not usually change suddenly, the waveform of an immediately preceding cycle and the waveform of a present cycle can be regarded as almost the same. For example, in FIG. 4, if waveform 2 is taken as the present waveform, a half-cycle T2 of the waveform 2 and a half-cycle T1 of a waveform 1 of the preceding cycle are almost the same.

Using these characteristics, the triangle wave voltage VB is generated by the following procedures.

Figure 4:
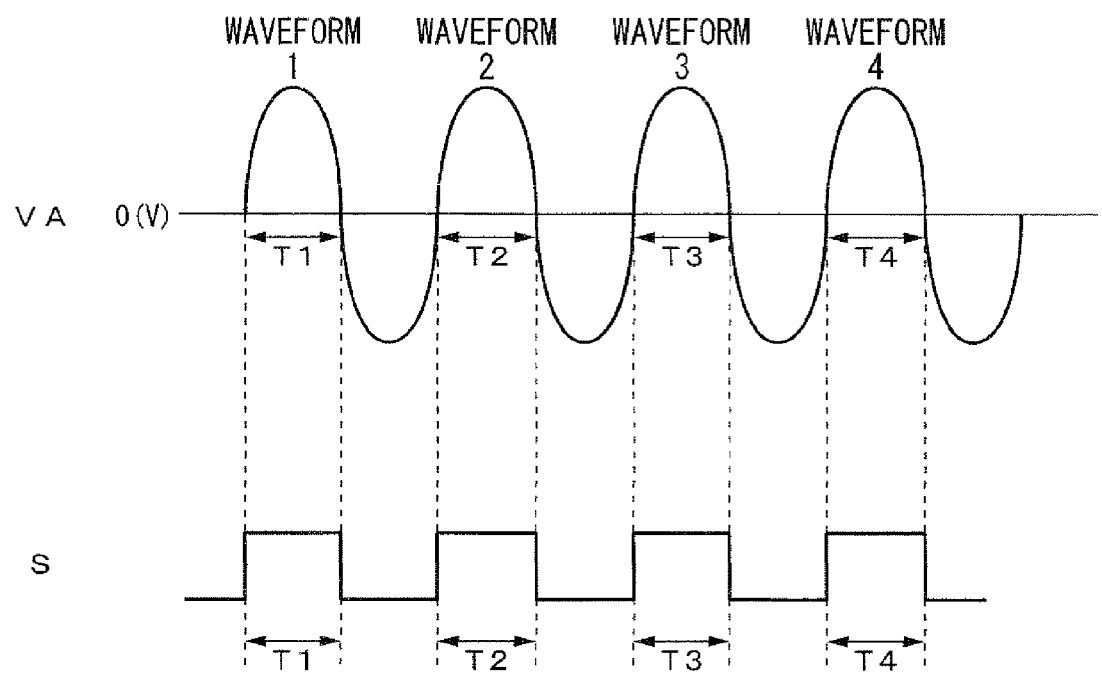
FIG. 4 is a waveform chart for explanation of a triangle wave generation mechanism (square wave generation process) in a triangle wave generating circuit according to the first embodiment of the invention.

{Procedure 1} As shown in FIG. 4, in the cycle of waveform 1, a square wave S is generated from the AC voltage VA outputted by the generator. A half-cycle of the square wave S corresponding to this waveform 1 matches a half-cycle T1 of the AC voltage VA in the cycle of waveform 1.

{Procedure 2} The time of the half-cycle T1 of the square wave S is counted.

{Procedure 3} The count number of the time of the half-cycle T1 is divided by a predetermined resolving power n, obtaining time t1 (=T1/n). The resolving power n is an amount that stipulates the smoothness of the slope of the triangle wave voltage VB; the higher the resolving power n, the smoother the slope of the triangle wave voltage VB.

{Procedure 4} The peak voltage Vp of the triangle wave voltage VB is divided by the predetermined resolving power n, obtaining a voltage v1 (=Vp/n).

Figure 5:
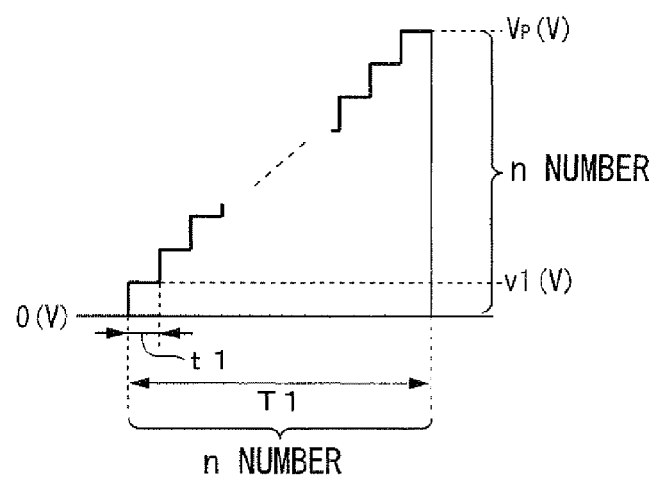
FIG. 5 is a waveform chart for explanation of a triangle wave generation mechanism (slope section generation process) in a triangle wave generating circuit according to the first embodiment of the invention.

{Procedure 5} As shown in FIG. 5, the triangle wave voltage VB is increases by the voltage v1 at the rise of a waveform 2 of the next cycle (at the point when counting of T2 starts), and this triangle wave voltage VB is maintained for time t1.

{Procedure 6} In the cycle of the same waveform 2, the triangle wave voltage VB is increased by the voltage v1 when the time t1 elapses; this is repeated for a total of n repetitions to obtain a step waveform such as that shown in FIG. 5, thereby obtaining a step waveform that corresponds to the slope section of the triangle wave voltage for the cycle of the waveform 2. By increasing the value of resolving power n, the step waveform is made smoother, whereby a superior triangle wave can be obtained.

By these procedures, the waveform of the AC voltage VA of the immediately preceding cycle is used in generating a triangle wave voltage corresponding to each cycle of the AC voltage VA, and having a voltage waveform with a constant peak voltage Vp.

The triangle wave generating circuit 1150 using the triangle wave voltage generation mechanism described above generates a triangle wave voltage for controlling the conduction timing of the thyristor 201 in the power converter, and can be configured from, for example, a counter unit, a division unit, and a waveform generation unit. The counter unit counts the time of a half-cycle of the AC voltage waveform of a first cycle outputted by the generator (e.g. time T1 in the cycle of waveform 1 in FIG. 4). The division unit divides the count number of the count unit by a predetermined resolving power n (predetermined value). In a second cycle after the first cycle (e.g. the cycle of waveform 2 in FIG. 4), the waveform generation unit generates a step voltage waveform that rises by the predetermined voltage v1 at each elapse of time t1, indicated by the division result obtained from the division unit in the first cycle. This step voltage waveform is outputted as a waveform of the triangle wave voltage.

Subsequently, the technological significance of inserting the amplifying circuit 1140 will be explained using FIG. 6.

Figure 6A:
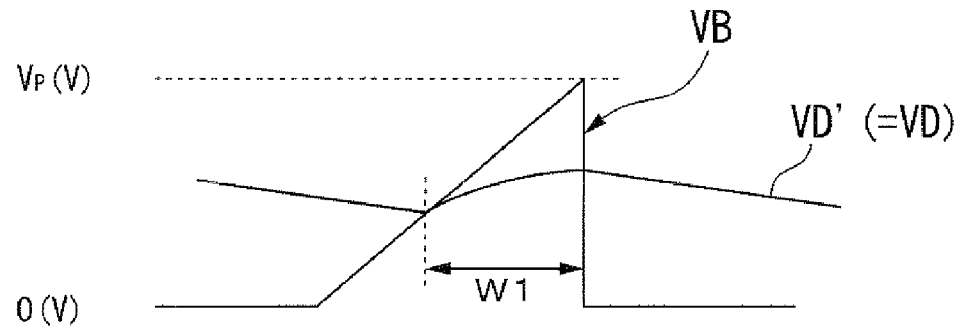
FIG. 6A is a waveform chart for explanation of effects obtained by an amplifying circuit according to the first embodiment of the invention.
Figure 6B:
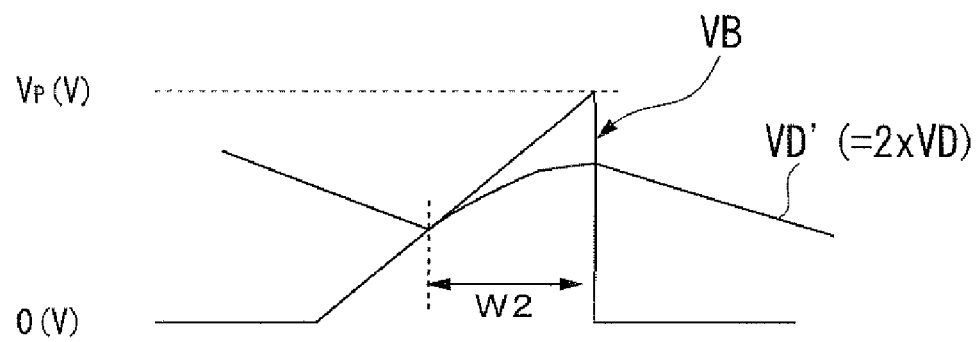
FIG. 6B is a waveform chart for explanation of effects obtained by an amplifying circuit according to the first embodiment of the invention.

FIG. 6A is the relative relationship between the triangle wave voltage VB and the differential voltage VD' (=VD) when the amplification factor of the amplifying circuit 1140, namely the magnification coefficient M, is '1'. In FIG. 6A, an interval W1 indicates a period when the triangle wave voltage VB exceeds the differential voltage VD', i.e. when the thyristor 201 is controlled in the ON state. FIG. 6B is the relative relationship between the triangle wave voltage VB and the differential voltage VD' (=2×VD) when the magnification coefficient M is set at '2'. As shown in FIG. 6B, when the differential voltage VD is amplified two times by setting the magnification coefficient M at '2', an interval W2 corresponding to the ON state of the thyristor 201 has twice the amount of fluctuation in comparison with the interval W1 of FIG. 6A; consequently, the response amount (sensitivity) of the pulse signal VSCR is twice the amount of fluctuation of the output voltage VO.

Figure 6C:
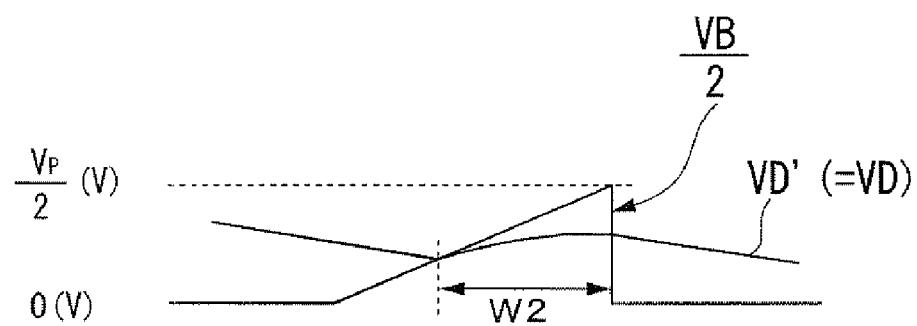
FIG. 6C is a waveform chart for explanation of effects obtained by an amplifying circuit according to the first embodiment of the invention.

As shown in FIG. 6C, this is equivalent to the peak voltage of the triangle wave voltage relatively decreasing to one-half (VB/2) with respect to the differential voltage VD' (=VD) when the magnification coefficient M is '1', and indicates that the control width has halved. Therefore, by inserting the amplifying circuit 1140 and amplifying the differential voltage VD by M times, the control width of the output voltage VO is relatively reduced to 1/M, enabling the output voltage VO to be controlled precisely at the target voltage VT.

The relationship between the height H (=peak voltage Vp) of the triangle wave voltage VB, the magnification coefficient M, the target voltage VT, and the control width W of the output voltage VO, is such that the value of W is within a range from VT to VT+(H/M). Therefore, when implementing the power converter, the height of the triangle wave voltage VB and the magnification coefficient M are set appropriately such as to satisfy that relationship, in accordance with the desired control width W and the target voltage VT.

Subsequently, application examples of the power converter 1000 will be explained with reference to FIGS. 7 to 14. Each application example takes as its basic principle the gate control mechanism already described with reference to FIGS. 1 to 6.

Figure 7:
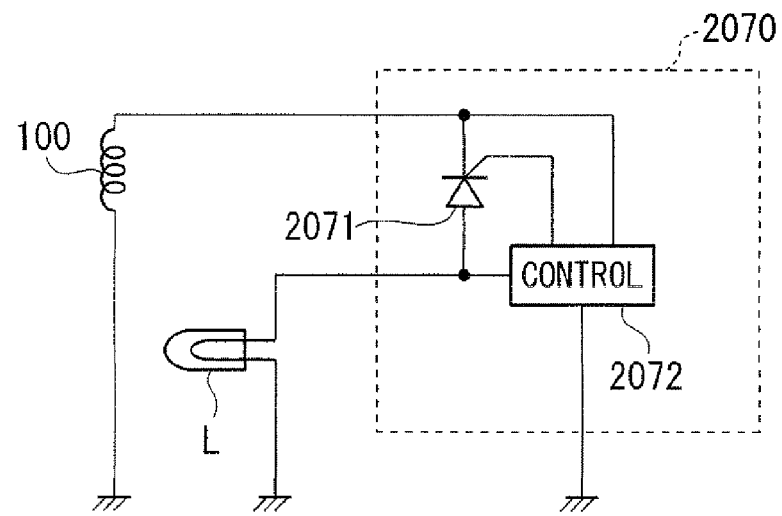
FIG. 7 is a diagram of a first other application example of a power converter according to the first embodiment of the invention.

A power converter 2070 shown in FIG. 7 has an open-circuit control configuration with a lamp L as a load, and includes a thyristor 2071 and a gate control unit 2072. An anode of the thyristor 2071 connects to the lamp L, and a cathode connects to a coil 100 of a generator. The conduction of the thyristor 2073 is thus controlled in each cycle of the negative phase of the AC voltage VA outputted from the generator.

Figure 8:
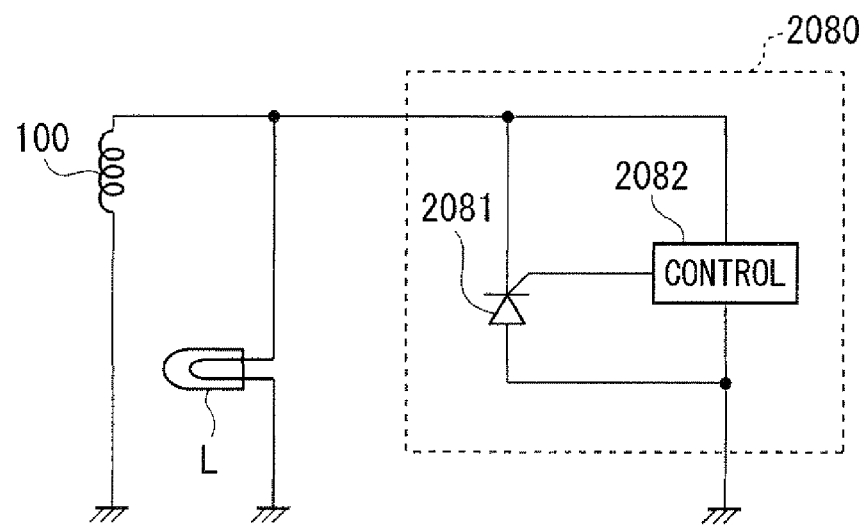
FIG. 8 is a diagram of a second other application example of a power converter according to the first embodiment of the invention.
Figure 9:
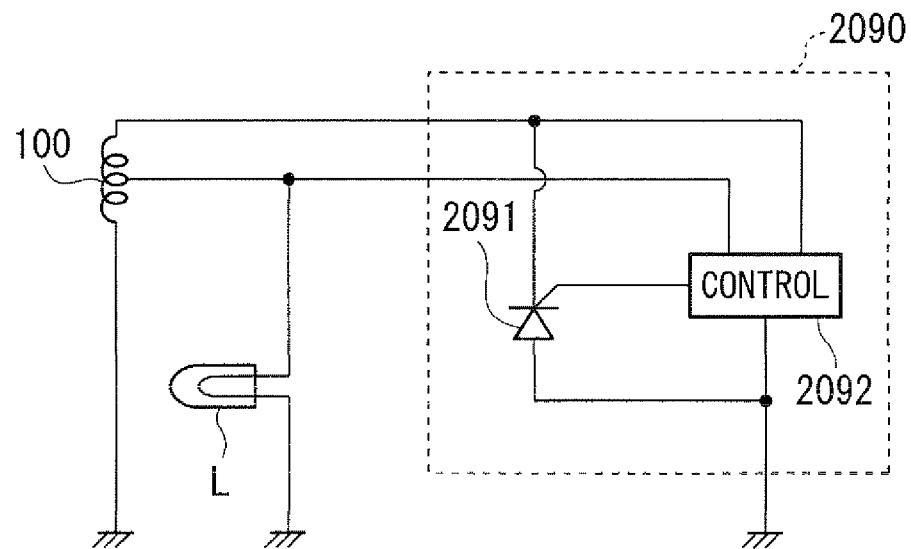
FIG. 9 is a diagram of a third other application example of a power converter according to the first embodiment of the invention.
Figure 10:
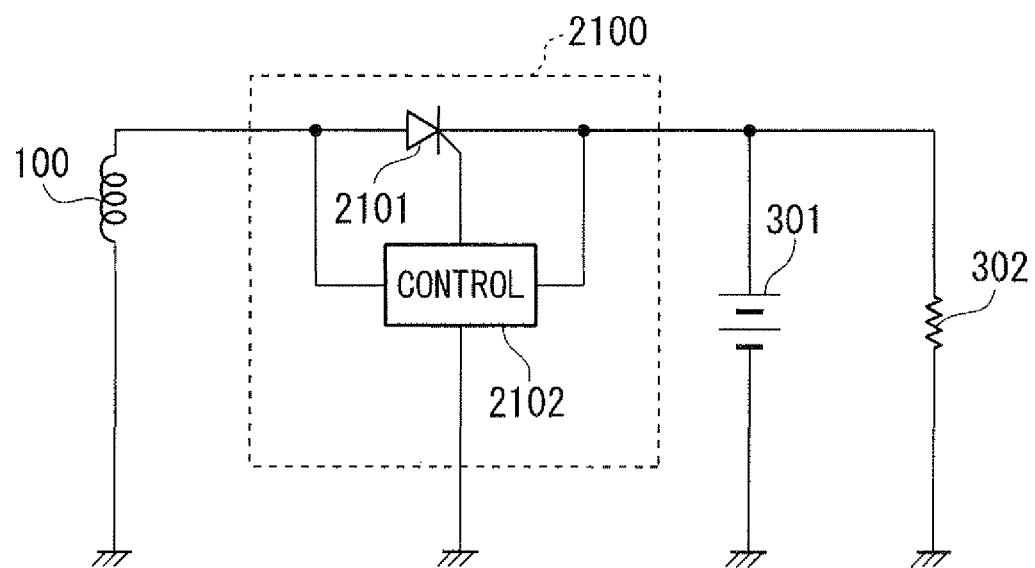
FIG. 10 is a diagram of a fourth other application example of a power converter according to the first embodiment of the invention.
Figure 11:
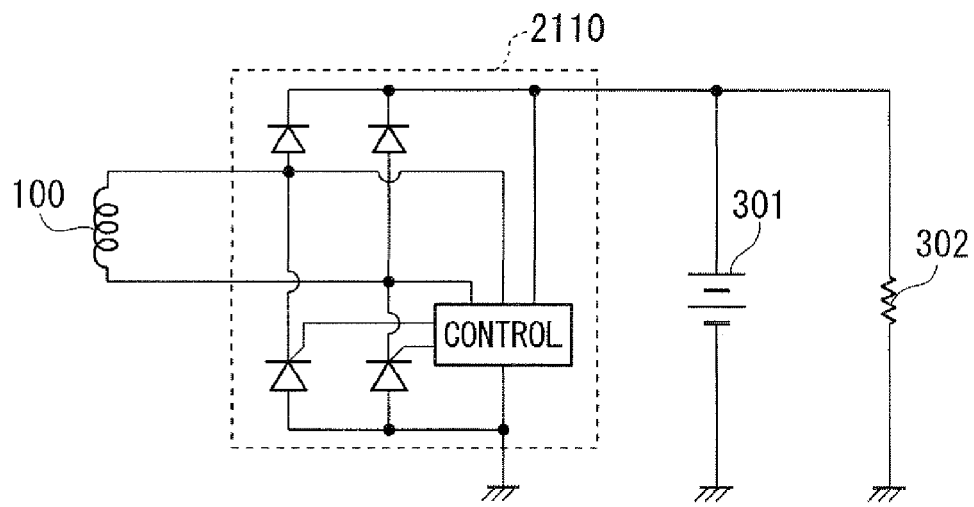
FIG. 11 is a diagram of a fifth other application example of a power converter according to the first embodiment of the invention.
Figure 12:
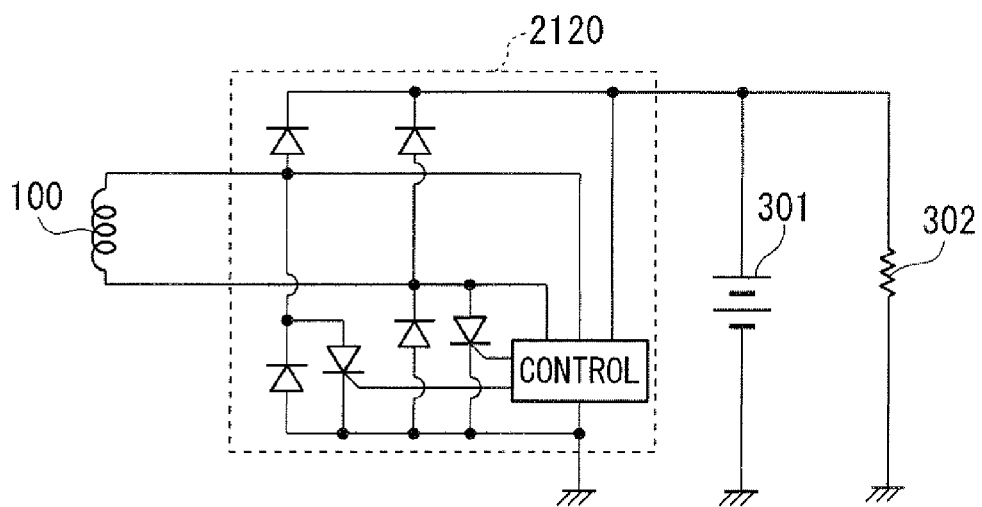
FIG. 12 is a diagram of a sixth other application example of a power converter according to the first embodiment of the invention.
Figure 13:
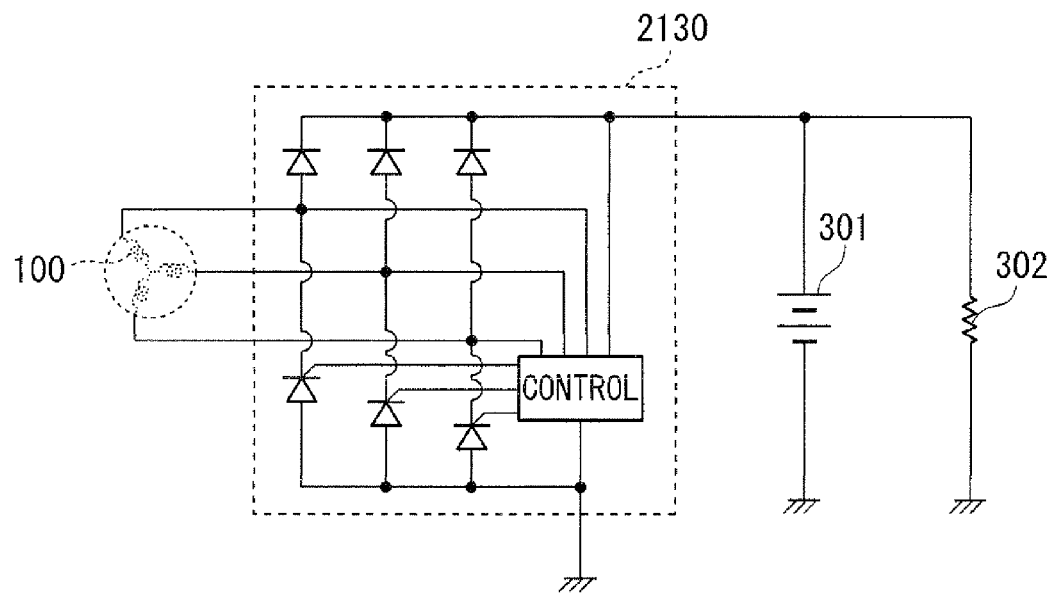
FIG. 13 is a diagram of a seventh other application example of a power converter according to the first embodiment of the invention.
Figure 14:
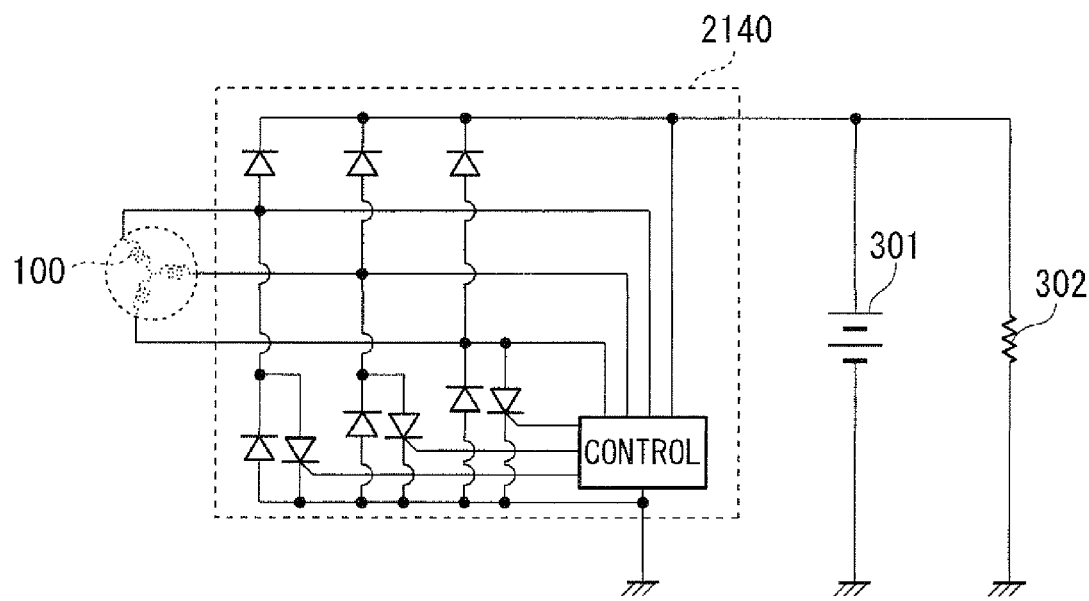
FIG. 14 is a diagram of an eighth other application example of a power converter according to the first embodiment of the invention.

A power converter 2080 shown in FIG. 8 has a short-circuit control configuration with a lamp L as a load. The power converter 2090 shown in FIG. 9 also has a short-circuit control configuration with a lamp L as a load. While in the earlier example of FIG. 1, the conductive period of the load is controlled, in this example, the nonconductive period is controlled (by short control). In FIG. 10, a power converter 2100 performs single-phase half-wave open control with a battery 301 and a resistor 302 as the load. A power converter 2110 shown in FIG. 11 performs single-phase full-wave open control with a battery and a resistor as the load. A power converter 2120 shown in FIG. 12 performs single-phase full-wave short control. A power converter 2130 shown in FIG. 13 performs triple-phase full-wave open control. A power converter 2140 shown in FIG. 14 performs triple-phase full-wave short control.

The invention is not limited to the embodiment described above, and can be modified without deviating from its main points.

For example, while in the embodiment shown in FIG. 1 to FIG. 6, only the positive phase element of an AC power outputted from the generator is supplied via the thyristor 201 to the load, and the output of the generator is half-wave rectified, this is not limitative of the invention, it being possible to perform full-wave rectification by similarly half-wave rectifying the negative phase element of the AC voltage outputted from the generator.

Furthermore, while the embodiment shown in FIG. 1 to FIG. 6 converts a single-phase AC power, it can also be applied to a multi-phase AC power.

Furthermore, while the embodiment shown in FIG. 1 to FIG. 6 controls the timing of turning ON the thyristor 201 that supplies power to the load, the configuration can be one that controls the timing of turning ON a thyristor that short-circuits the generator.

Furthermore, while the embodiment shown in FIG. 1 to FIG. 6 provides the amplifying circuit 1140 to increase the sensitivity of the gate-control of the thyristor 201 as explained above, the amplifying circuit 1140 can be omitted if the control width of the output voltage VO is sufficient.

Moreover, while the embodiment shown in FIG. 1 to FIG. 6 provides the voltage conversion circuit 1110, it can be omitted when controlling a DC current.

Second Embodiment

In this embodiment, in the power converter 1000 according to the first embodiment, the configuration of the voltage conversion circuit 1110 is further improved.

Figure 15:
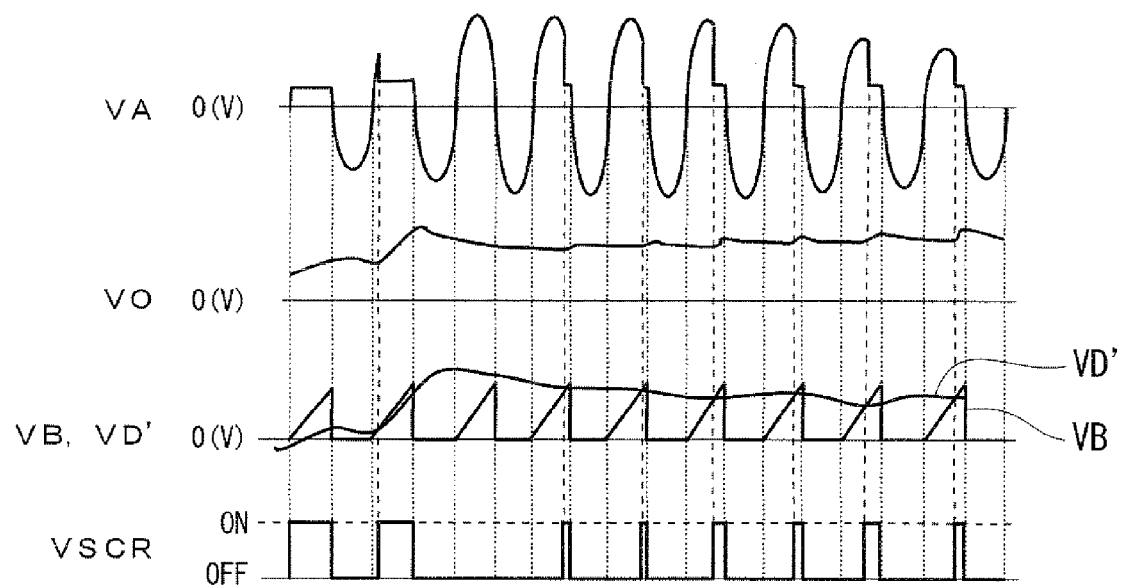
FIG. 15 is a waveform chart of an example, in the first embodiment of the invention, when an output voltage VO increases excessively immediately after a generator starts generating power.

In the first embodiment, there are cases where the output voltage VO increases excessively immediately after the generator starts generating power. FIG. 15 is a specific example of such a state. In the example of FIG. 15, the left side is a generation start timing of a generator. As shown in FIG. 15, since the differential voltage VD' is small when the generator starts, there is a long period when the pulse signal VSCR is at the high level (ON). As a result, the time during which the AC voltage VA is supplied to the battery 300 (charge time) becomes longer. Although the output voltage VO increases due to the supply of AC voltage VA to the battery 300, it increases sizably during the long charge time and becomes excessive as shown in FIG. 15.

The fluctuation in the amplitude of the AC voltage VA in FIG. 15 indicates that the output of the generator is shaky. Generally, the output of a generator is often shaky at start-up, as shown in FIG. 15. Also, the distorted waveform indicates that the output of the generator is clamped when the thyristor 201 is ON.

In this embodiment, a limit voltage VL is additionally inserted into the configuration of the voltage conversion circuit 1110, such that the output voltage VO does not increase sizably. The limit voltage VL restricts the maximum value of the charge time. This will be explained in detail.

Figure 16:
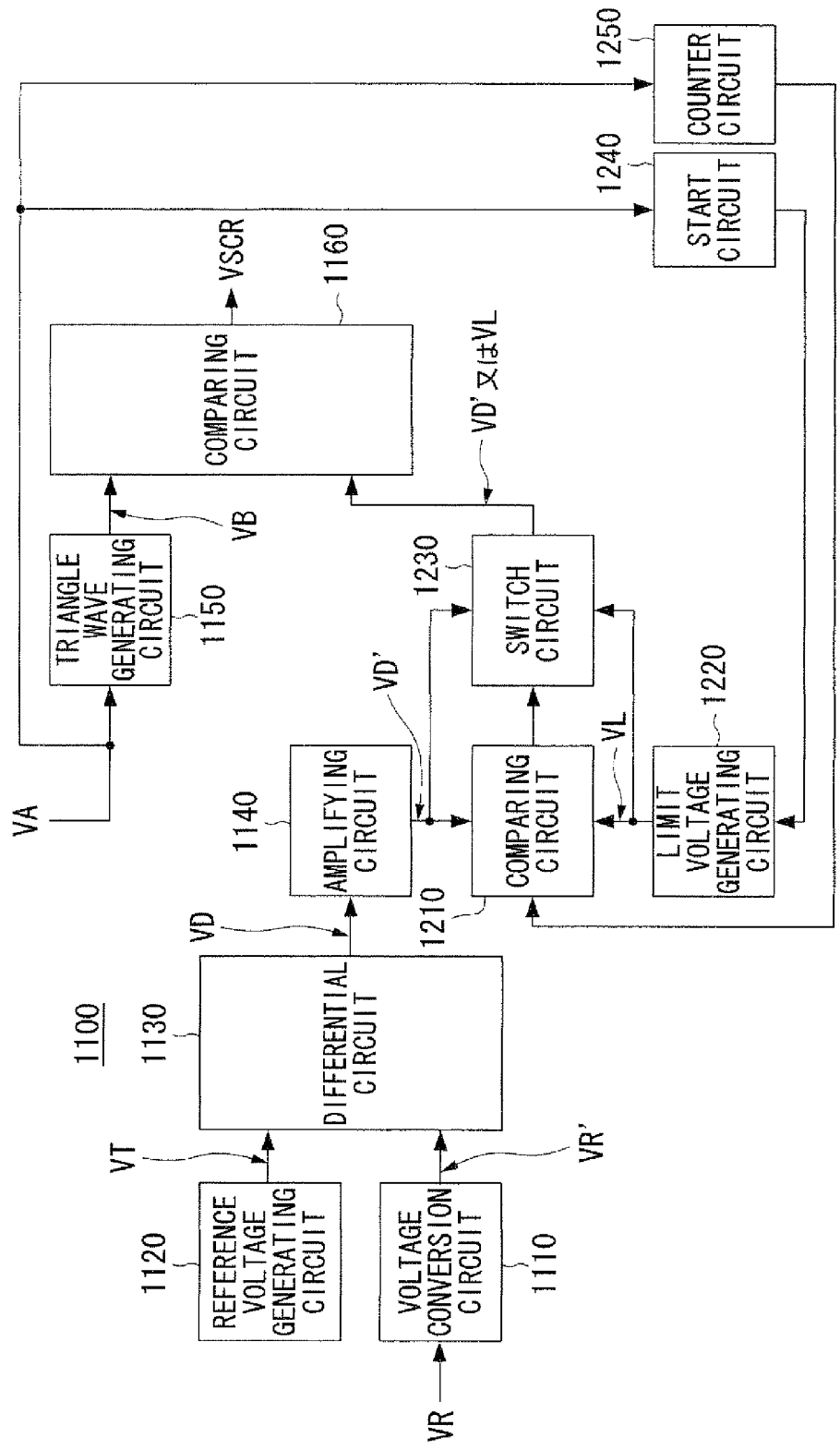
FIG. 16 is a block diagram of a detailed configuration of a gate control unit according to a second embodiment of the invention.

FIG. 16 is diagram of a detailed configuration of the gate control unit 1100 according to this embodiment. In FIG. 16, constituent elements which are common to those in the configuration of the gate control unit 1100 according to the first embodiment (FIG. 2) are designated by like reference numerals.

As shown in FIG. 16, the gate control unit 1100 according to this embodiment includes a voltage conversion circuit 1110, a reference voltage generating circuit 1120, a differential circuit 1130, a amplifying circuit 1140, a triangle wave generating circuit 1150, and a comparing circuit 1160, and further includes a comparing circuit 1210, a limit voltage generating circuit 1220, a switch circuit 1230, a start circuit 1240, and a counter circuit 1250.

In this embodiment, the output unit of the amplifying circuit 1140 connects to input units of the comparing circuit 1210 and the switch circuit 1230. The differential voltage VD' is thus input to the comparing circuit 1210 and the switch circuit 1230.

The limit voltage generating circuit 1220 generates a limit voltage VL having a predetermined voltage value, and its output unit connects to input units of the comparing circuit 1210 and the switch circuit 1230. The limit voltage VL is thus also input to the comparing circuit 1210 and the switch circuit 1230.

The comparing circuit 1210 and the switch circuit 1230 function as a selection circuit which, based on the size relationship between a limit voltage generated by the limit voltage generating circuit 1220 and a differential voltage generated by the differential circuit 1130, selects one of the limit voltage and the differential voltage, and outputs it to the comparing circuit 1160. More specifically, the switch circuit 1230 includes a switch for outputting one of the differential voltage VD' and the limit voltage VL inputted thereto to the comparing circuit 1160. The comparing circuit 1210 compares the inputted differential voltage VD' and the limit voltage VL. In accordance with that result, it then controls the switch of the switch circuit 1230. Specifically, it controls it such that whichever is larger of the differential voltage VD' and the limit voltage VL is outputted to the switch circuit 1230.

The output unit of the start circuit 1240 connects to an input unit of the limit voltage generating circuit 1220. The start circuit 1240 monitors the AC voltage VA inputted to the triangle wave generating circuit 1150, and, when the AC voltage VA starts to be inputted, outputs a start signal to the limit voltage generating circuit 1220 to make it start generating the limit voltage VL.

An output unit of the counter circuit 1250 connects to the input unit of the comparing circuit 1210. Similar to the start circuit 1240, the counter circuit 1250 monitors the AC voltage VA inputted to the triangle wave generating circuit 1150, and, when the AC voltage VA starts to be inputted, starts a clock count that is generated by an unillustrated oscillator. When the counter value exceeds a predetermined threshold, the counter circuit 1250 controls the comparing circuit 1210 such that the differential voltage VD' is thereafter always outputted from the switch circuit 1230. Specifically, it outputs a differential voltage VD' selection command signal to the comparing circuit 1210.

When the start signal is input, the limit voltage generating circuit 1220 starts outputting the limit voltage VL. When the differential voltage VD' selection command signal is input, the comparing circuit 1210 thereafter always outputs the differential voltage VD' to the switch circuit 1230.

Figure 17:
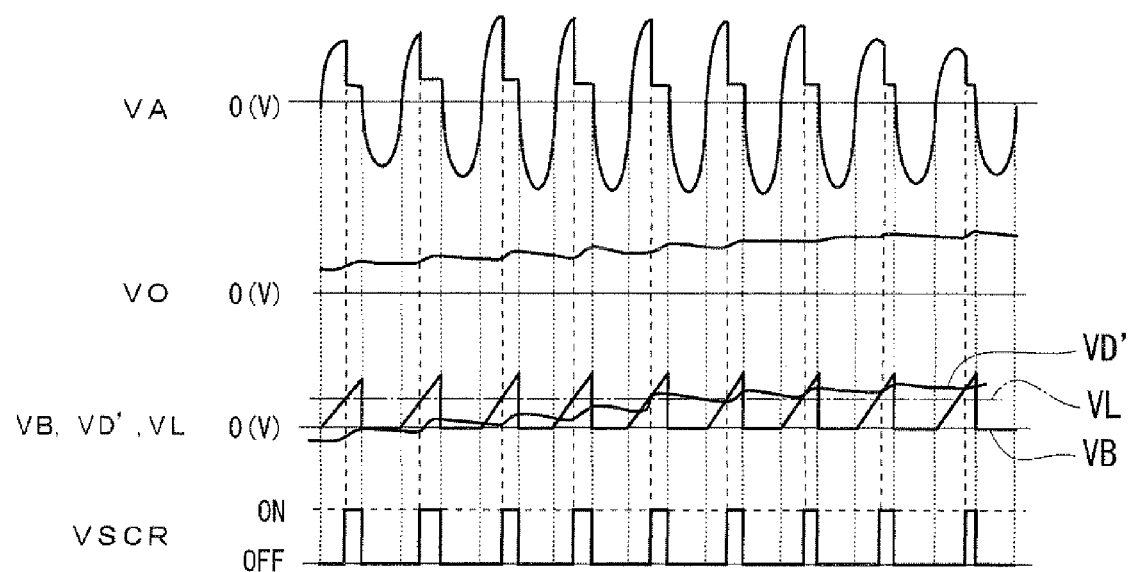
FIG. 17 is a waveform chart for explanation of an operation of a power converter according to the second embodiment of the invention.

Subsequently, an operation of the gate control unit 1100 according to this embodiment will be explained while referring to FIG. 17. Similarly in the example of FIG. 17, the left side is a generation start timing of a generator. When the generator starts generating power, an AC voltage VA starts inputting to the triangle wave generating circuit 1150. The start circuit 1240 detects this, and starts outputting a limit voltage VL to the limit voltage generating circuit 1220.

While the voltage value of the limit voltage VL should be determined appropriately by tests and the like, it is usual to use a value of approximately two-thirds of the maximum voltage value of the triangle wave voltage VB. If the limit voltage VL has approximately this voltage value, immediately after the generator starts generating power, the limit voltage VL will have a larger value than the differential voltage VD'. Consequently, the triangle wave voltage VB and the limit voltage VL will be inputted to the comparing circuit 1160. Since the comparing circuit 1160 outputs the pulse signal VSCR at the high level in intervals when the triangle wave voltage VB is larger than the limit voltage VL, and otherwise outputs it at the low level, the time during which the pulse signal VSCR is at the high level (charge time) shown in FIG. 17 is shorter than that in FIG. 15, where the differential voltage VD' is inputted to the comparing circuit 1160. This prevents the output voltage VO from rising sizably, and also prevents an excessive increase in the output voltage VO.

With the above configuration, however, there may be cases when the differential voltage VD' does not increase any further than the limit voltage VL. The output voltage VO may not increase due to the battery 300 being old, or some such reason; nevertheless, since the comparing circuit 1210 is controlled according to the counter circuit 1250 such that, after a predetermined time, the switch circuit 1230 always outputs the differential voltage VD', the output voltage VO can be made to increase appropriately even in such cases.

As described above, this embodiment can prevent a sizable rise in the output voltage VO when the generator starts generating power, and can ensure that the output voltage VO increases appropriately thereafter.

Third Embodiment

This embodiment is a modification of the gate control unit 1100 according to the second embodiment.

In the second embodiment, while the counter circuit 1250 controls the comparing circuit 1210 such that the output voltage VO increases appropriately when it is not already doing so, the third embodiment achieves this by controlling the value of the limit voltage VL.

Figure 18:
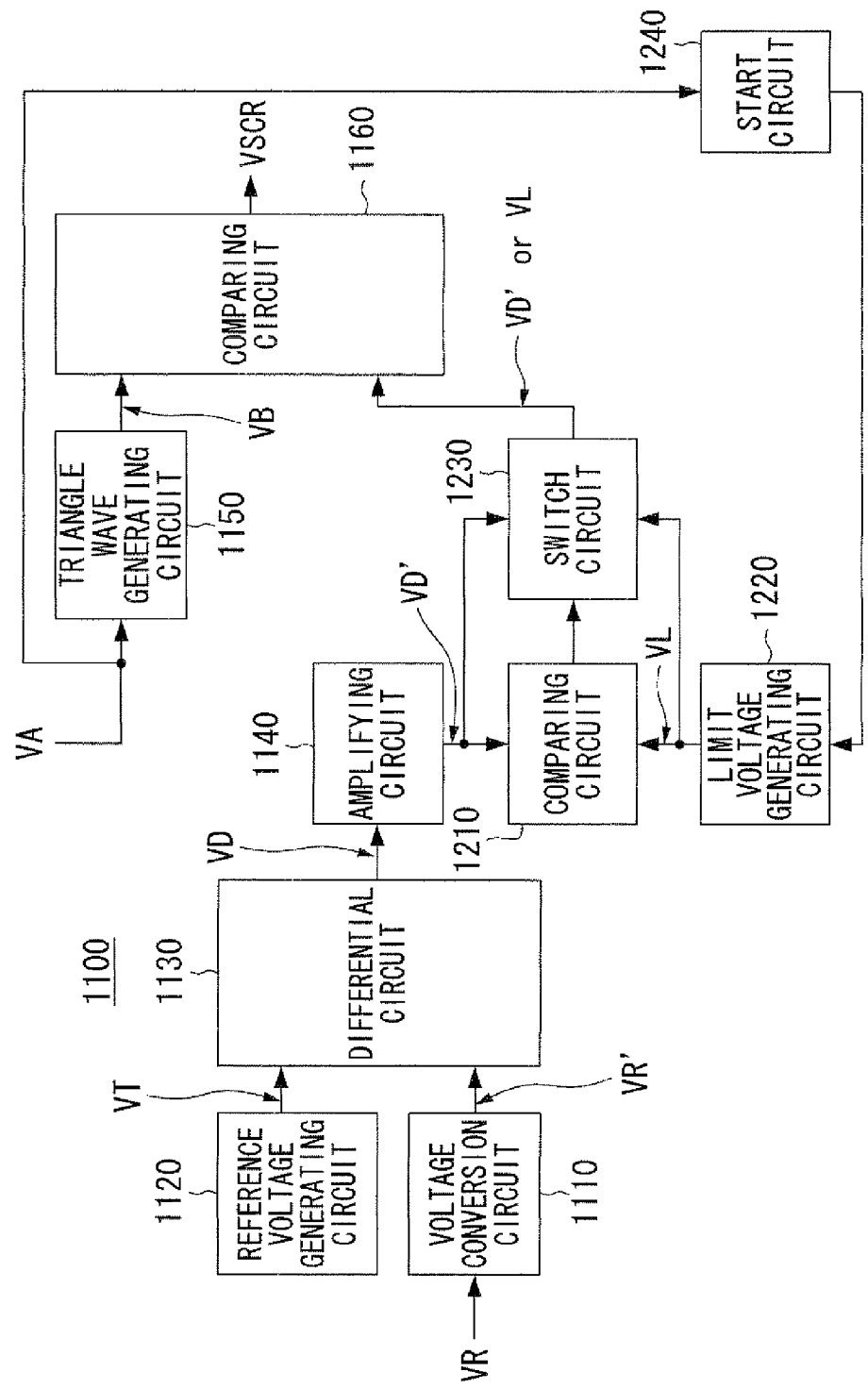
FIG. 18 is a block diagram of a detailed configuration of a gate control unit according to a third embodiment of the invention.

FIG. 18 is a diagram of a detailed configuration of a gate control unit 1100 according to this embodiment. In FIG. 18, constituent parts which are common to those of the gate control unit 1100 according to the second embodiment (FIG. 16) are designated with like reference numerals.

As shown in FIG. 18, the gate control unit 1100 according to this embodiment includes a voltage conversion circuit 1110, a reference voltage generating circuit 1120, a differential circuit 1130, a amplifying circuit 1140, a triangle wave generating circuit 1150, a comparing circuit 1160, a comparing circuit 1210, a limit voltage generating circuit 1221, switch circuit 1230, and a start circuit 1240.

Although not shown in FIG. 18, the limit voltage generating circuit 1221 includes a CR circuit including a capacitor and a resistor, and a switch. An electrical charge for the limit voltage VL is stored beforehand in the capacitor. The switch is connected to the CR circuit and an output unit of the limit voltage generating circuit 1221, and is OFF in an initial state. When a start signal is inputted, the switch turns ON and the capacitor starts to discharge. The voltage generated by discharging is outputted as a limit voltage VL to the comparing circuit 1210 and the switch circuit 1230. The voltage value of the limit voltage VL outputted from the limit voltage generating circuit 1221 gradually decreases due to transient phenomena, and eventually becomes zero.

Subsequently, an operation of the gate control unit 1100 according to this embodiment will be explained with reference to FIG. 19.

Figure 19:
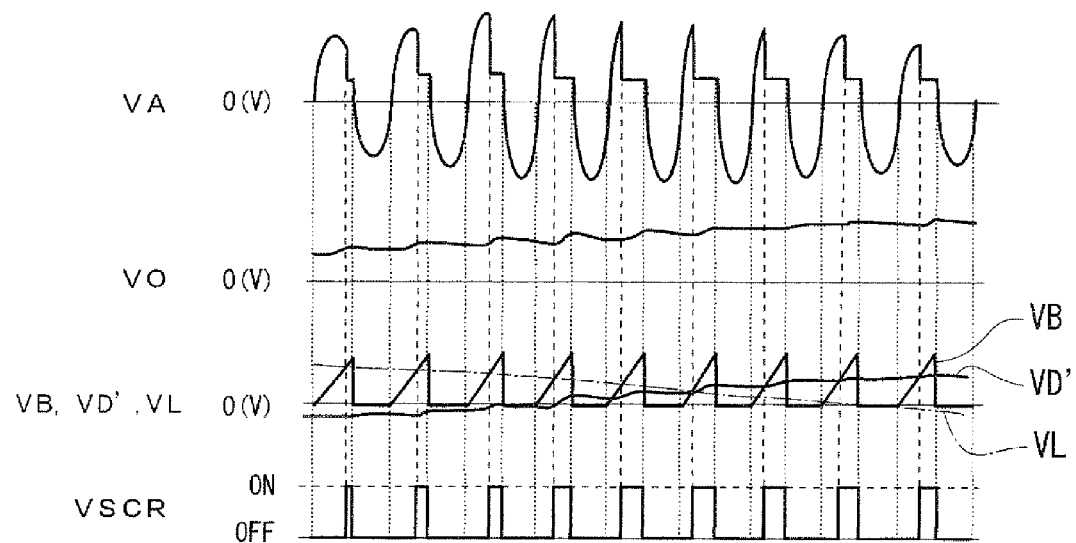
FIG. 19 is a waveform chart for explanation of an operation of a power converter according to the third embodiment of the invention.

In the example of FIG. 19, similarly, the left side is a generation start timing of a generator. When the generator starts generating power, an AC voltage VA starts inputting to the triangle wave generating circuit 1150. The start circuit 1240 detects this, and starts outputting a limit voltage VL to the limit voltage generating circuit 1220.

As already mentioned, the voltage value of the limit voltage VL outputted from the limit voltage generating circuit 1220 gradually decreases. If the limit voltage VL is initially set at a sufficiently large value, the output voltage VO will be prevented from increasing sizably. As the limit voltage VL decreases, the differential voltage VD' becomes more likely to exceed it, whereby, even if the output voltage VO does not increase sufficiently due to the battery 300 being old or some such reason, it will be possible to increase the output voltage VO appropriately.

As described above, this embodiment can prevent a sizable rise in the output voltage VO when the generator starts generating power, and can ensure that the output voltage VO increases appropriately thereafter.

Fourth Embodiment

This embodiment further improves the configuration of the gate control unit 1100 in the power converter 1000 according to the second embodiment.

Figure 20:
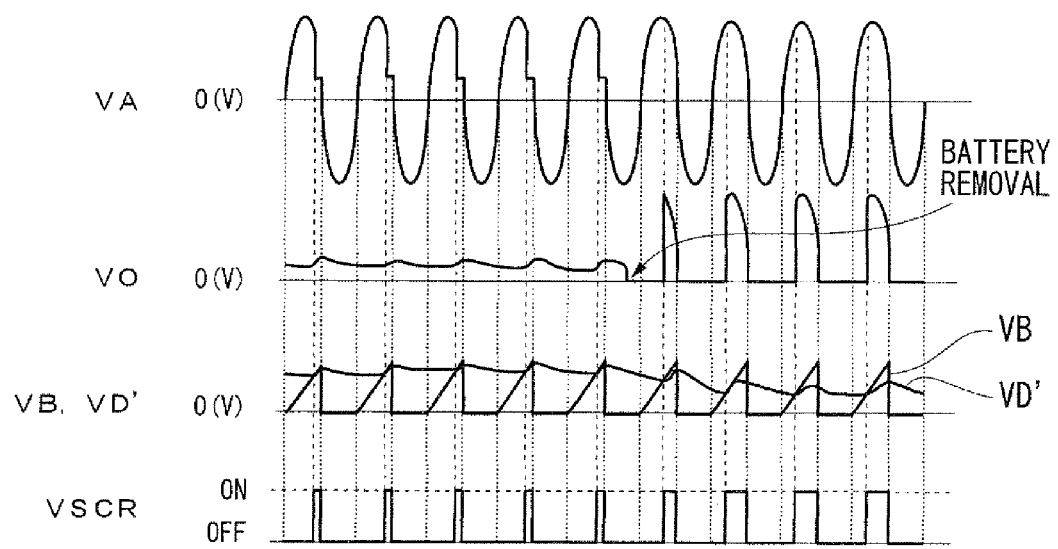
FIG. 20 is a waveform chart of an example, in the first embodiment of the invention, when a load is removed while charging and the charge time increases.

The first embodiment is problematic in that the charge time increases when the load (battery 300) is removed during charging. FIG. 20 is a specific example of such a state. As shown in FIG. 20, when the battery 300 is removed, if the pulse signal VSCR is at the high level, the unaltered AC voltage VA appears as the output voltage VO. On the other hand, if the pulse signal VSCR is at the high@[low] level, the output voltage VO is 0. Therefore, the voltage VR', which is the effective value of the voltage VR, gradually decreases, and so does the differential voltage VD'. As a consequence, as shown in FIG. 20, the charge time (the period when the pulse signal VSCR is at the high level) gradually increases.

However, charging is meaningless after the battery 300 is removed. Accordingly, this embodiment detects that the battery 300 has been removed and activates a limit voltage at that time, thereby preventing an increase in the charge time due to the removal of the battery 300.

Figure 21:
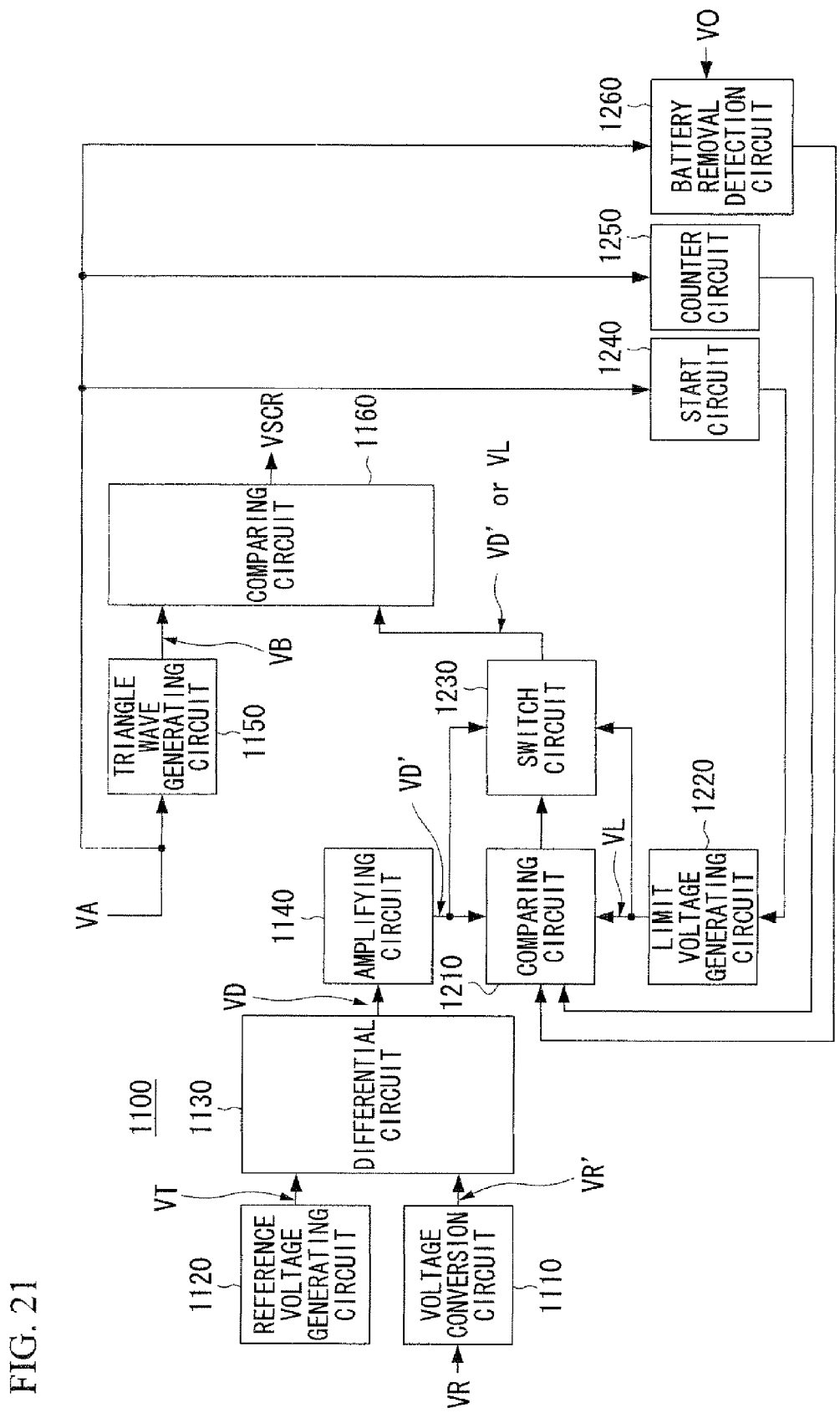
FIG. 21 is a block diagram of a detailed configuration of a gate control unit according to a fourth embodiment of the invention.

FIG. 21 is a detailed configuration of a gate control unit 1100 according to this embodiment. In FIG. 21, constituent parts which are common to those of the gate control unit 1100 according to the second embodiment (FIG. 16) are designated with like reference numerals.

As shown in FIG. 21, the gate control unit 1100 according to this embodiment includes a voltage conversion circuit 1110, a reference voltage generating circuit 1120, a differential circuit 1130, an amplifying circuit 1140, a triangle wave generating circuit 1150, a comparing circuit 1160, a comparing circuit 1210, a limit voltage generating circuit 1220, a switch circuit 1230, a start circuit 1240, a counter circuit 1250, and a battery removal detection circuit 1260.

An output unit of the battery removal detection circuit 1260 connects to an input unit of the comparing circuit 1210. The battery removal detection circuit 1260 detects that the battery 300 has been removed. Specifically, it monitors the AC voltage VA and the output voltage VO, and, when the output voltage VO is at 0 while the AC voltage VA has a negative value (when the AC voltage VA is in a negative cycle), detects a removal of the battery 300. When it detects the removal of the battery 300, it generates a battery removal detection signal and outputs it to the comparing circuit 1210.

When the comparing circuit 1210 receives the battery removal detection signal, even if it is making the switch circuit 1230 always output the differential voltage VD' at that point, it thereafter controls the switch circuit 1230 in accordance with the comparison result of the inputted differential voltage VD' and the limit voltage VL. Specifically, it makes the switch circuit 1230 output whichever of the differential voltage VD' and the limit voltage VL is larger.

Subsequently, an operation of the gate control unit 1100 according to this embodiment will be explained with reference to FIG. 22.

Figure 22:
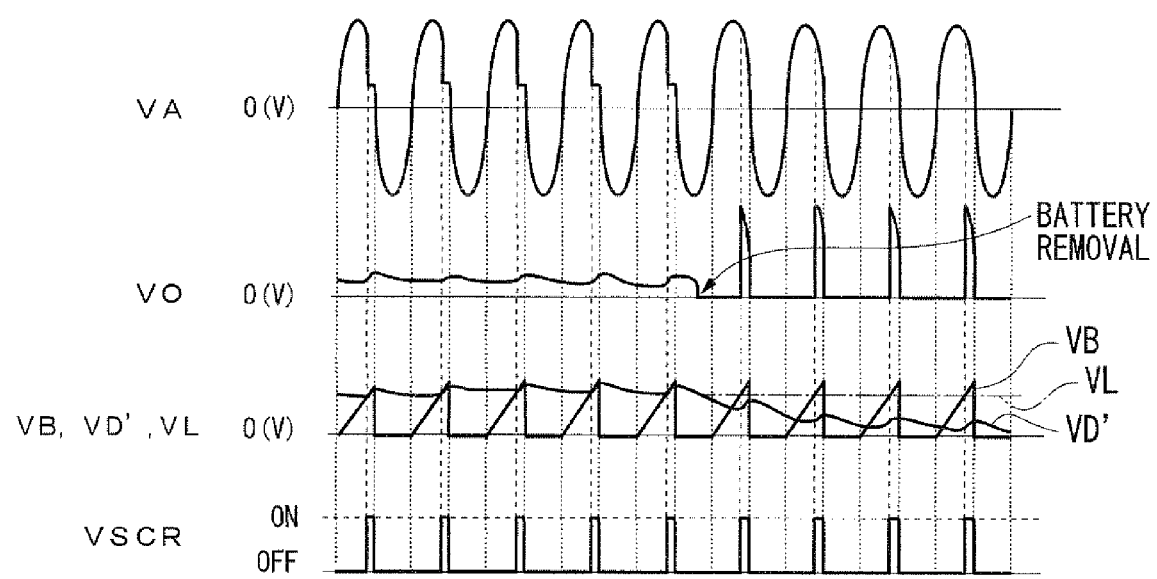
FIG. 22 is a waveform chart for explanation of an operation of a power converter according to the fourth embodiment of the invention.

As shown in FIG. 22, when the battery is removed, in the negative cycle of the AC voltage VA, the output voltage VO becomes 0. The battery removal detection circuit 1260 detects this state. As already described, it then activates the limit voltage VL. The limit voltage VL limits the maximum value of the charge time, and, as shown in FIG. 22, these processes prevent an increase in the charge time.

As described above, this embodiment prevents the charge time from being increased by the removal of the battery.

Fifth Embodiment

As in the fourth embodiment, this embodiment prevents the charge time from being increased by removal of the battery, but differs from the fourth embodiment in that it achieves this by reducing the target voltage VT. This will be explained in detail.

Figure 23:
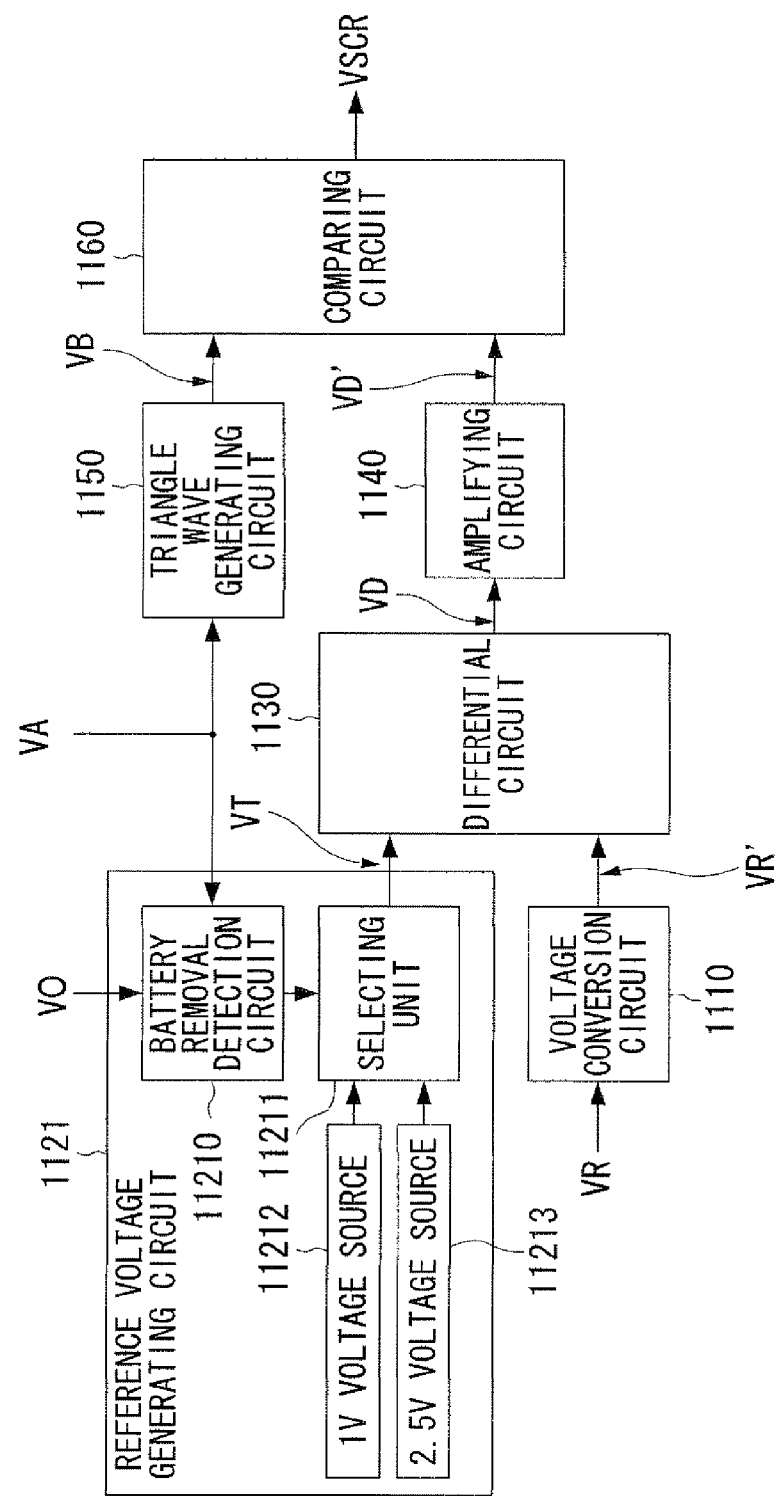
FIG. 23 is a block diagram of a detailed configuration of a gate control unit according to a fifth embodiment of the invention.

FIG. 23 is a detailed configuration of a gate control unit 1100 according to this embodiment. In FIG. 23, constituent elements which are common to those in the configuration of the gate control unit 1100 according to the first embodiment (FIG. 2) are designated by like reference numerals.

As shown in FIG. 23, the gate control unit 1100 according to this embodiment includes a voltage conversion circuit 1110, a reference voltage generating circuit 1121, a differential circuit 1130, an amplifying circuit 1140, a triangle wave generating circuit 1150, and a comparing circuit 1160. The reference voltage generating circuit 1121 internally includes a battery removal detection circuit 11210, a selection unit 11211, a 1.5V voltage source 11212, and a 2.5V voltage source 11223. In the following explanation, the target voltage VT in the first embodiment is 2.5V.

An output unit of the battery removal detection circuit 11210 connects to an input unit of the selection unit 11211. The battery removal detection circuit 11210 detects a removal of the battery 300. Specifically, it monitors the AC voltage VA and the output voltage V0, and, when the output power VO is at 0 while the AC voltage VA has a negative value (while the AC voltage VA is in a negative cycle), detects a removal of the battery 300. When it detects the removal of the battery 300, it generates a battery removal detection signal and outputs it to the selection unit 11211.

The selection unit 11211 is connected to the 1V voltage source 11212 and the 2.5V voltage source 11223, and usually outputs a 2.5V voltage outputted from the 2.5V voltage source 11223 as a target voltage VT to the differential circuit 1130. When a battery removal detection signal is inputted, the selection unit 11211 thereafter outputs a 1V voltage outputted from the 1V voltage source 11212 as the target voltage VT to the differential circuit 1130. Since the target voltage VT decreases as a consequence, the value of VD' determined in accordance with the value of VR'-VT increases, shortening the charge time.

As described above, this embodiment prevents the charge time from being increased by the removal of the battery.

Sixth Embodiment

This embodiment is a modification of the triangle wave generating circuit 1150 in the gate control unit 1100 according to the first embodiment.

While the triangle wave generating circuit 1150 according to the first embodiment obtains a triangle wave having a step-like hypotenuse in accordance with the increase in the triangle wave voltage VB, the triangle wave generating circuit 1150 of this embodiment obtains a triangle wave having a smooth hypotenuse. In this embodiment, as in the first embodiment, the frequency of the AC voltage outputted from the generator does not normally change abruptly, enabling the waveform of an immediately preceding cycle and the waveform of a present cycle to be regarded as almost the same.

Figure 24:
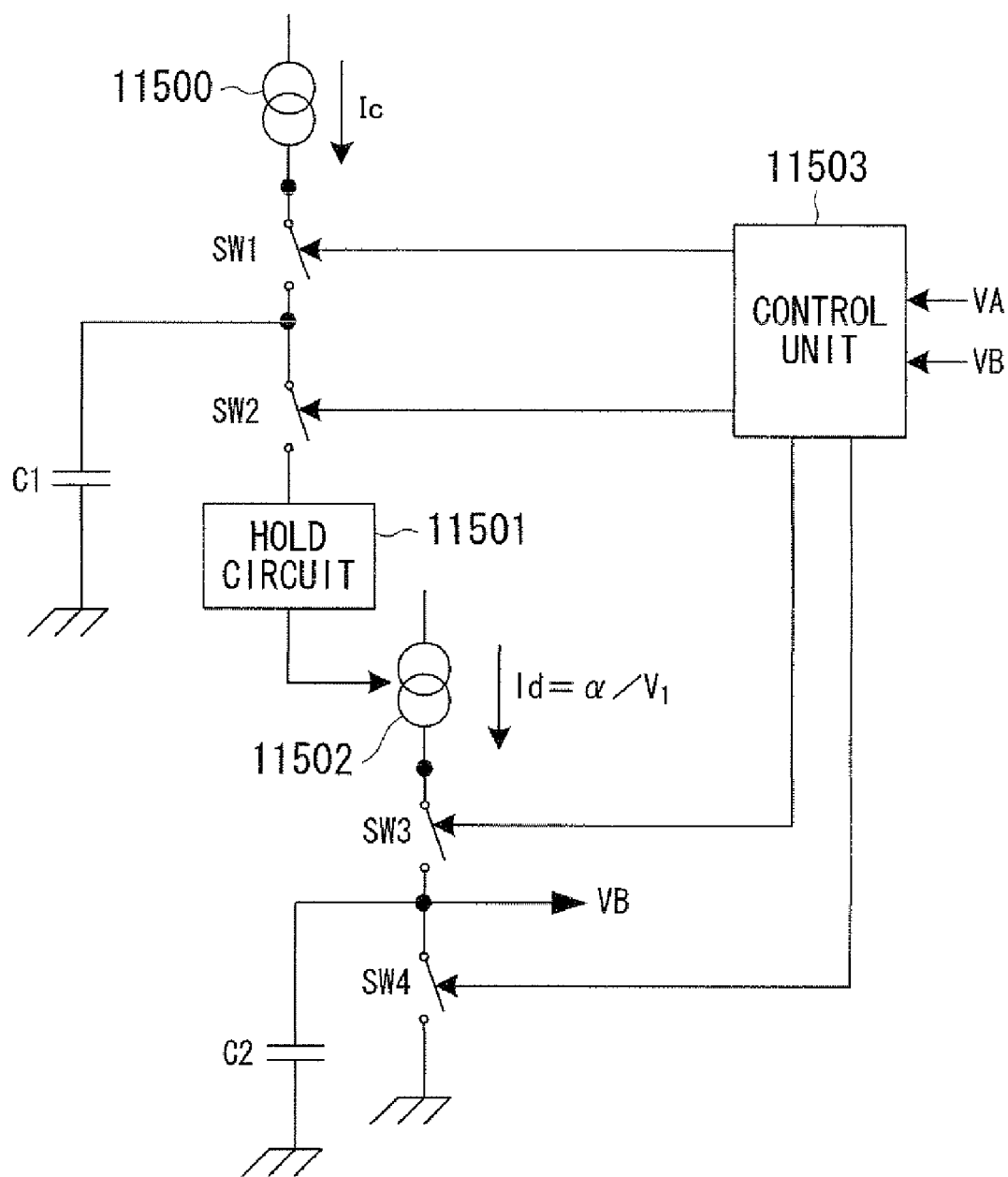
FIG. 24 is a diagram of an internal configuration of a triangle wave generating circuit according to a sixth embodiment of the invention.

FIG. 24 is an internal configuration of the triangle wave generating circuit 1150 according to this embodiment. As shown in FIG. 24, the triangle wave generating circuit 1150 includes a constant current source 11500, a hold circuit 11501, a constant current source 11502, a control unit 11503, switches SW1 to SW4, and capacitors C1 and C2.

The constant current source 11500, the control unit 11503, and the switches SW1 to SW2 function as a first charge unit that charges the capacitor C1 with a constant current having a predetermined current value while the AC voltage outputted from the generator is in the positive cycle or the negative cycle (the positive cycle in this case). The hold circuit 11501, the constant current source 11502, the control unit 11503, and the switches SW3 to SW4 perform as a second charge unit that charges the capacitor C2 with a constant current having a current value based on the voltage between the terminals of the capacitor C1 when the above cycle ends. Moreover, the control unit 11503 functions as a control unit that ends charging by the second charge unit, based on the AC voltage cycle and the voltage between the terminals of the capacitor C2. The triangle wave generating circuit 1150 outputs the voltage between the terminals of the capacitor C2 during charging by the second charge unit as a waveform of a triangle wave voltage. Processes of the constituent elements will be explained in detail.

The constant current source 11500 connects to one terminal of the switch SW1. Another terminal of the switch SW1 connects to one terminal of the capacitor C1 and one terminal of the switch SW2. Another terminal of the capacitor C1 connects to ground. Another terminal of the switch SW2 connects to the hold circuit 11501. The hold circuit 11501 also connects to the constant current source 11502.

The constant current source 11502 connects to one terminal of the switch SW3, and another terminal of the switch SW3 connects to one terminal of the capacitor C2 and one terminal of the switch SW4. Another terminal of the capacitor C2 connects to ground. Another terminal of the switch SW3 forms an output terminal of the triangle wave generating circuit 1150.

The constant current source 11500 generates a current whose value is fixed at $I_C$, and flows to one terminal of the switch SW1.

The control unit 11503 switches the switches SW1 to SW4 in accordance with the values of the AC voltage VA and the triangle wave voltage VB generated by the triangle wave generating circuit 1150. Specifically, when the AC voltage VA has a positive value, the control unit 11503 turns ON the switches SW1 and SW3, and turns OFF the switches SW2 and SW4. When the AC voltage VA does not have a positive value, it turns ON the switches SW2 and SW4, and turns OFF the switches SW1 and SW3. However, when the wave height value of the triangle wave voltage VB reaches a target voltage V0 described later, irrespective of the value of the AC voltage VA, the control unit 11503 turns OFF the switch SW3 and turns ON the switch SW4.

As a result of the operations of the switches SW1 and SW2 controlled by the control unit 11503, when the AC voltage VA has a positive value, the capacitor C1 is charged with the current $I_C$.

The relationship between a charge current I of a capacitor (static capacitance C) and a voltage V(t) between its terminals is generally expressed by equation (1). Here, t is the charge time.

{Equation 1}

$$V(t) = \frac{1}{C} I t \quad (1)$$

Figure 25:
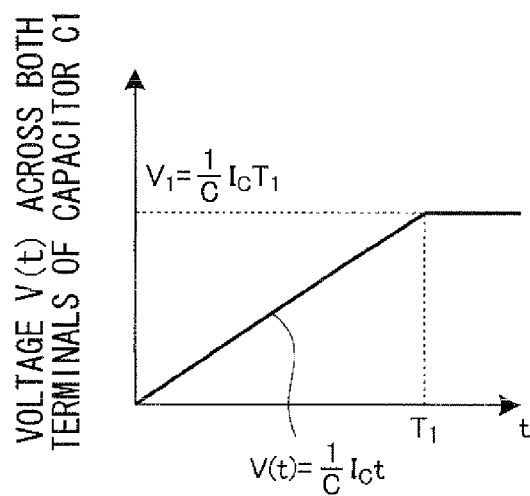
FIG. 25 is a diagram of a time transition of a voltage between capacitor terminals according to the sixth embodiment of the invention.

As shown by equation (1), if $T_1$ is the time during which the AC voltage VA has a positive value, as shown in FIG. 25, the voltage $V_1$ between the terminals of the capacitor C1 after time $T_1$ is expressed by equation (2). This equation (2) indicates that the time $T_1$ can be converted to the voltage $V_1$. The static capacitance of the capacitors C1 and C2 here is C.

{Equation 2}

$$V_1 = \frac{1}{C} I_C T_1 \quad (2)$$

The result of the operations of the switches SW1 and SW2 is that, when the AC voltage VA no longer has a positive value, the capacitor C1 starts discharging. As a result of the operation of the switch SW2, this discharge current is inputted to the hold circuit 11501. The hold circuit 11501 acquires the voltage $V_1$ of the immediately preceding cycle by receiving an input of the discharge current of the capacitor C1, and holds it.

The constant current source 11502 generates a current having a constant current value $I_D$ obtained from equation (3), and flows to one terminal of the switch SW3.

{Equation 3}

$$I_D = \frac{\alpha}{V_1} \quad (3)$$

where α is a coefficient expressed by equation (4). Incidentally, $V_0$ is a target value of a peak voltage value (wave height value) of the triangle wave voltage, e.g. 5V.

{Equation 4}

$$\alpha = V_0 I_C \quad (4)$$

Figure 26:
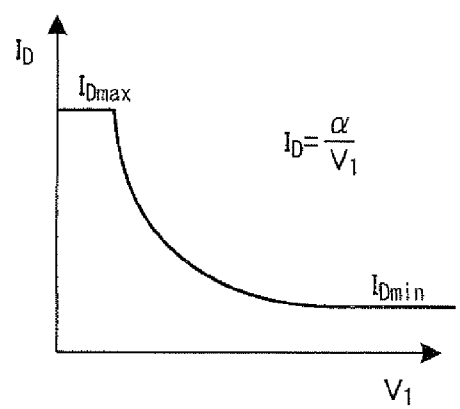
FIG. 26 is a diagram of the relationship between current value and voltage according to the sixth embodiment of the invention.

FIG. 26 is the relationship between the current value $I_D$ and the voltage $V_1$ shown in equations (3) and (4). As shown in FIG. 26, when the size of the voltage $V_1$ fluctuates, the current ID calculated from equation (3) exceeds the maximum $I_{DMAX}$ and minimum $I_{DMIN}$ of the current that the constant current source 11502 can generate; therefore, the triangle wave generating circuit 1150 is preferably used within a range that does not exceed these levels.

When the AC voltage VA changes from a negative value to a positive one as a result of the switches SW3 and SW4 being controlled by the control unit 11503, the capacitor C2 starts to be charged with the current value $I_D$. Generally, when a current having a constant current value flows to a capacitor, the voltage between the terminals of the capacitor increases at a constant rate of increase in accordance with the size of the constant current value. Using this characteristic of a capacitor, while charging the capacitor C2 with the current value $I_D$, the voltage $V_2$ between the terminals of the capacitor C2 is outputted as the triangle wave voltage VB.

When the charge time is $T_2$, the voltage $V_2$ between the terminals of the capacitor C2 is expressed using equations (1) to (4) with the following equation (5).

{Equation 5}

$$V_2 = \frac{1}{C} I_D T_2 = \frac{1}{C} \frac{V_0 I_C}{V_1} T_2 = \frac{1}{C} \frac{V_0 I_C}{\frac{1}{C} I_C T_1} T_2 = V_0 \frac{T_2}{T_1} \quad (5)$$

The charge time $T_2$ of the capacitor C2 is the time from when SW3 turns ON and SW4 turns OFF until SW3 turns OFF and SW4 turns ON. This corresponds to the time during which the AC voltage VA has a positive value. As stated above, since the frequency of the AC voltage outputted from the generator does not normally change abruptly, the waveform of an immediately preceding cycle and the waveform of a present cycle can be regarded as almost the same; hence $T_2$ and $T_1$ can be regarded as equal. As a result, equation (5) can be further modified as equation (6).

{Equation 6}

$$V_2 = V_0 \qquad (6)$$

These processes generate a triangle wave voltage VB which has a smooth hypotenuse, and has the target value V0 as its peak voltage. Its cycle is $T_1$.

Figure 27:
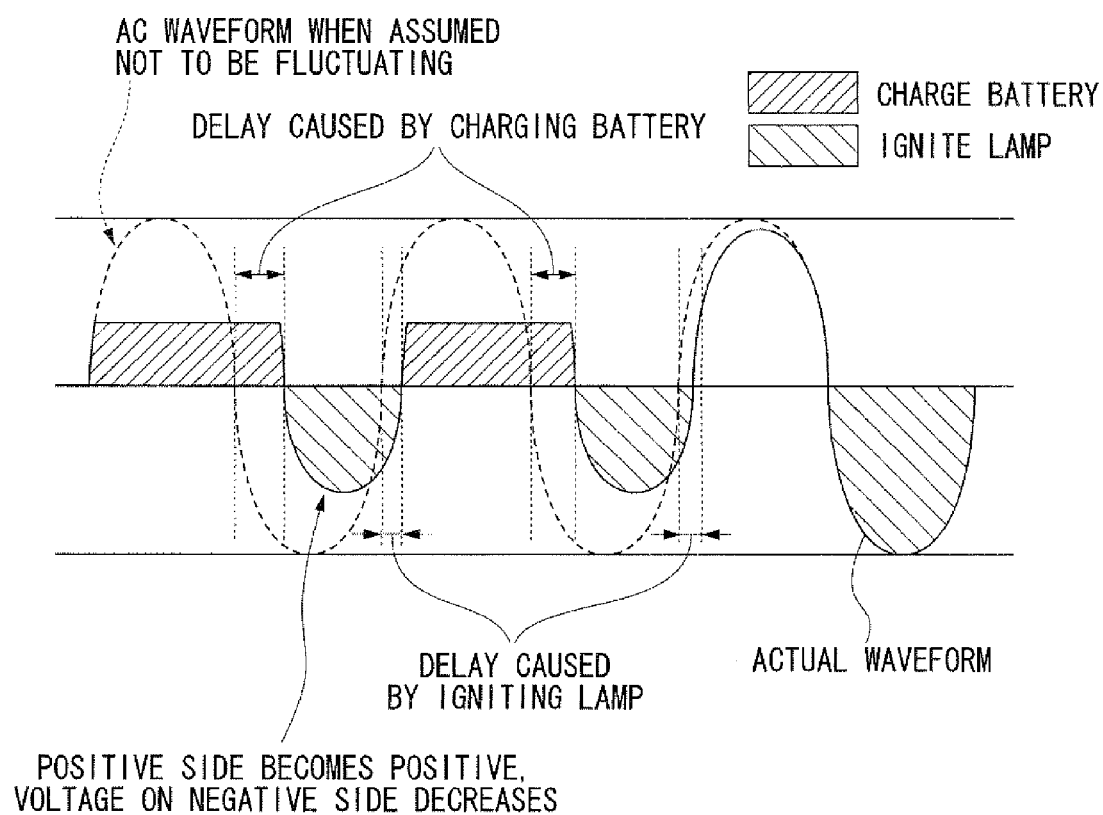
FIG. 27 is an explanatory diagram of an example, in the sixth embodiment of the invention, when an immediately preceding cycle and a present cycle are not the same.

Strictly speaking, there are cases where the immediately preceding cycle and the present cycle are not the same. FIG. 27 is an explanatory diagram of an example of such a case. In the example shown in FIG. 27, for sake of convenience, a lamp is also used as a load in addition to the battery 300. As shown in FIG. 27, waveform distortion and delay caused by battery charging, and a delay caused by lamp ignition, are generated in the AC voltage inputted to the load.

When the immediately preceding cycle is longer than the present cycle, i.e. when $T_2 > T_1$, based on equation (5), the voltage value of the triangle wave voltage VB does not reach the target voltage $V_0$ by the end of the charge time. On the other hand, when the immediately preceding cycle is shorter than the present cycle, i.e. when $T_2 < T_1$, based on equation (5), the voltage value of the triangle wave voltage VB reaches the target voltage $V_0$ before the charge time ends. In this case, when the voltage value of the triangle wave voltage VB has reached the target voltage $V_0$, irrespective of the value of the AC voltage VA, the control unit 11503 turns OFF the switch SW3 and turns ON the switch SW4, thereby terminating the output of the triangle wave voltage VB at the point when its voltage value has reached the target voltage $V_0$.

It is also effective if, after the output of the generator has become stable, the control unit 11503 calculates an average of the several cycles up till then, and terminates the output of the triangle wave voltage VB (turns OFF the switch SW3 and turns ON the switch SW4) at the point where the time elapsed since the triangle wave output of the present cycle started has reached the calculated average cycle. This can reduce the effect of abrupt changes in the output cycle of the generator on the output cycle of the triangle wave voltage.

Subsequently, an operation of the triangle wave generating circuit 1150 according to this embodiment will be explained with reference to an example shown in FIG. 28.

Figure 28:
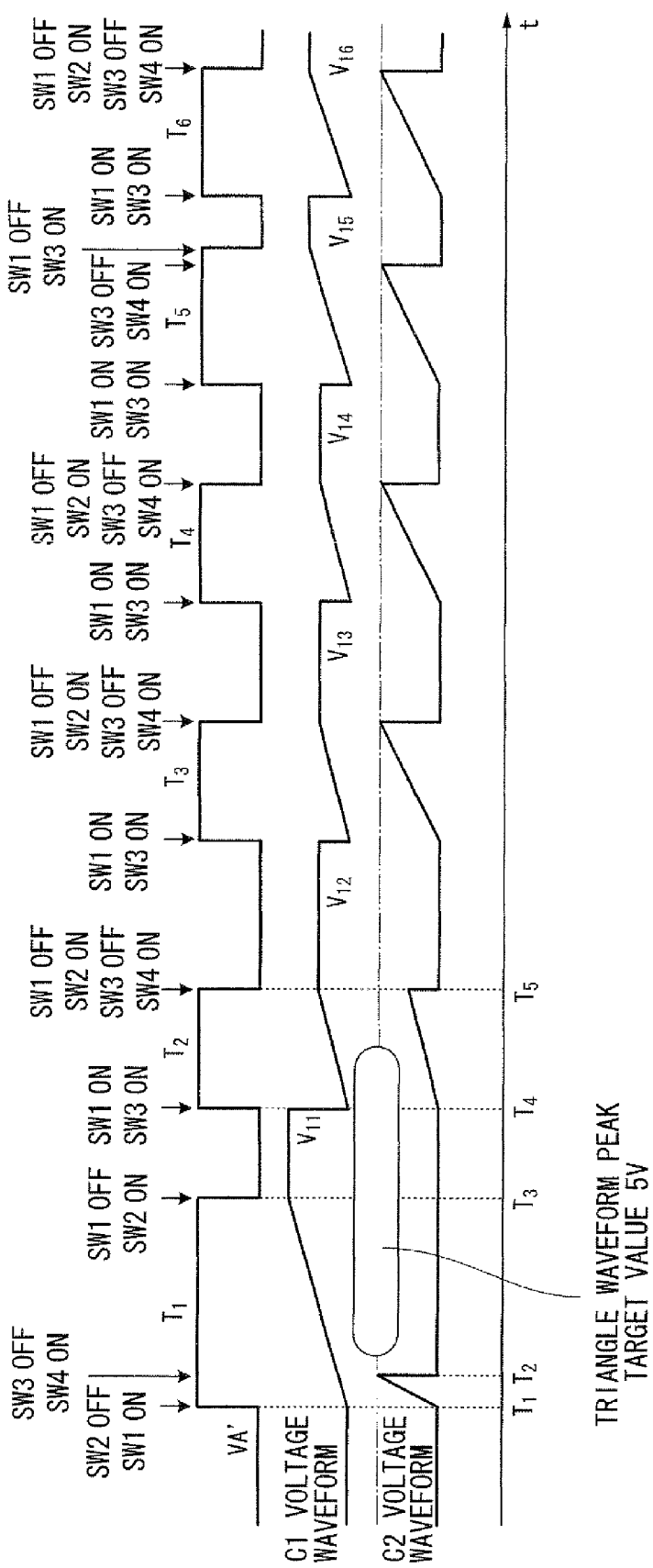
FIG. 28 is a waveform chart for explanation of an operation of a triangle wave generating circuit according to the sixth embodiment of the invention.

FIG. 28 is a waveform of the voltage at both terminals of the capacitor C1 (C1 voltage waveform) and a waveform of the voltage at both terminals of capacitor C2 (C2 voltage waveform) at six cycles of AC voltage VA after the generator starts generating power. In FIG. 28, a square wave voltage VA' is at the high level when the AC voltage VA has a positive value, and at the low level when the AC voltage VA has a negative value, and is inserted as an imaginary example for explanatory purposes.

When the generator starts generating power, SW1 turns ON and SW2 turns OFF, and the capacitor C1 starts charging with a constant current value $I_C$. If the positive cycle was $T_1$ ($= t_3 - t_1$), the voltage $V_{11}$ between the terminals of the capacitor C1 is, based on equation (2), $V_{11} = I_C T_1 / C$. The hold circuit 11501 holds this voltage $V_{11}$, and makes the constant current source 11502 generates a constant current value $I_D$ having the value indicated by equation (3).

At time t4, the next positive cycle of the AC voltage VA starts. In addition, SW3 turns ON and SW4 turns OFF, whereby the capacitor C2 starts charging and the triangle wave voltage VB starts being outputted. In FIG. 28, since the cycle T2 of the second positive cycle is shorter than the cycle T1 of the first positive cycle, at time $t_5$ ($= t_4 + T_2$), SW3 turns OFF and SW4 turns ON, ending outputting of the triangle wave voltage VB without it having reached the target voltage $V_0$ (5V in this example).

The voltage value held by the hold circuit 11501 in an initial state (before time $t_1$) is not determined. In the example of FIG. 28, this voltage has an extremely high value, and the outputting of the triangle wave ends at time $t_2$ soon after time $t_1$ elapses.

After time $t_5$, similarly, the triangle wave voltage VB starts outputting, and, as shown in FIG. 28, when the output of the generator becomes stable, the cycle and peak voltage of the triangle wave also become stable.

As described above according to this embodiment, a triangle wave having a smooth hypotenuse can be obtained, and, when a time equal to one immediately preceding cycle of the AC voltage VA has elapsed since the start of outputting the triangle wave, its voltage can be controlled to the target voltage $V_0$.

Seventh Embodiment

This embodiment applies the power converter 1000 according to the first embodiment in a circuit that performs triple-phase full-wave rectification.

Figure 29:
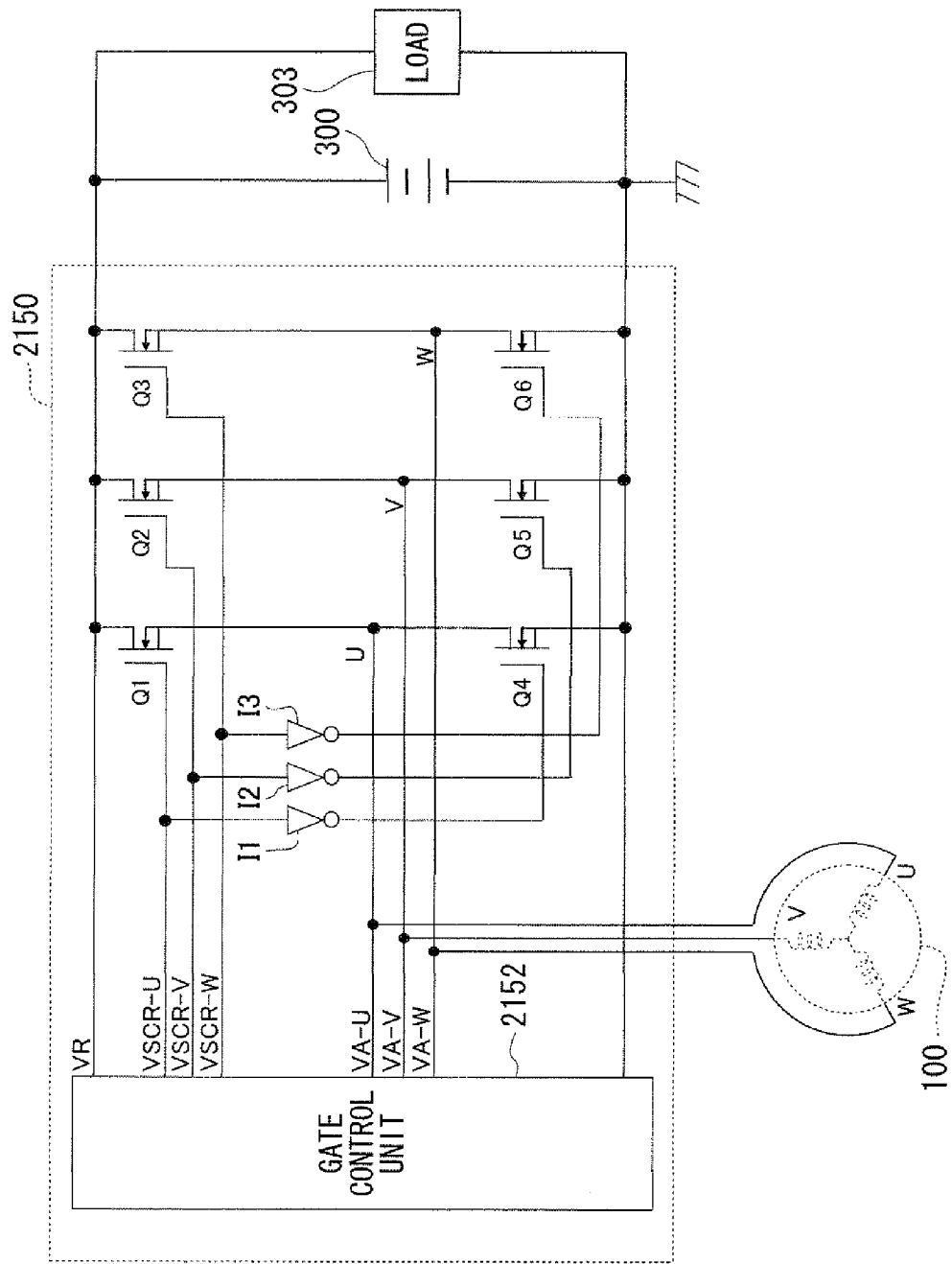
FIG. 29 is a diagram of a configuration and an application example of a power converter according to a seventh embodiment of the invention.

In FIG. 29, a power converter 2150 is configured such as to control triple-phase full-wave rectification with a battery 300 and a load 303 as its loads, and includes power metal oxide semiconductor field effect transistors (MOSFET) Q1 to Q6, inverters I1 to I3, and a gate control unit 2152. The power MOSFETs Q1 to Q6 are used as switch units in this embodiment.

Sources of the power MOSFETs Q1 to Q6 are connected to a U-phase output, a V-phase output, and a W-phase output of a triple-phase AC generator including a coil 100. Drains of the power MOSFETs Q1 to Q6 are connected to the gate control unit 2152, a plus side of the battery 300, and the load 303, and their gates are connected to the gate control unit 2152.

Figure 30:
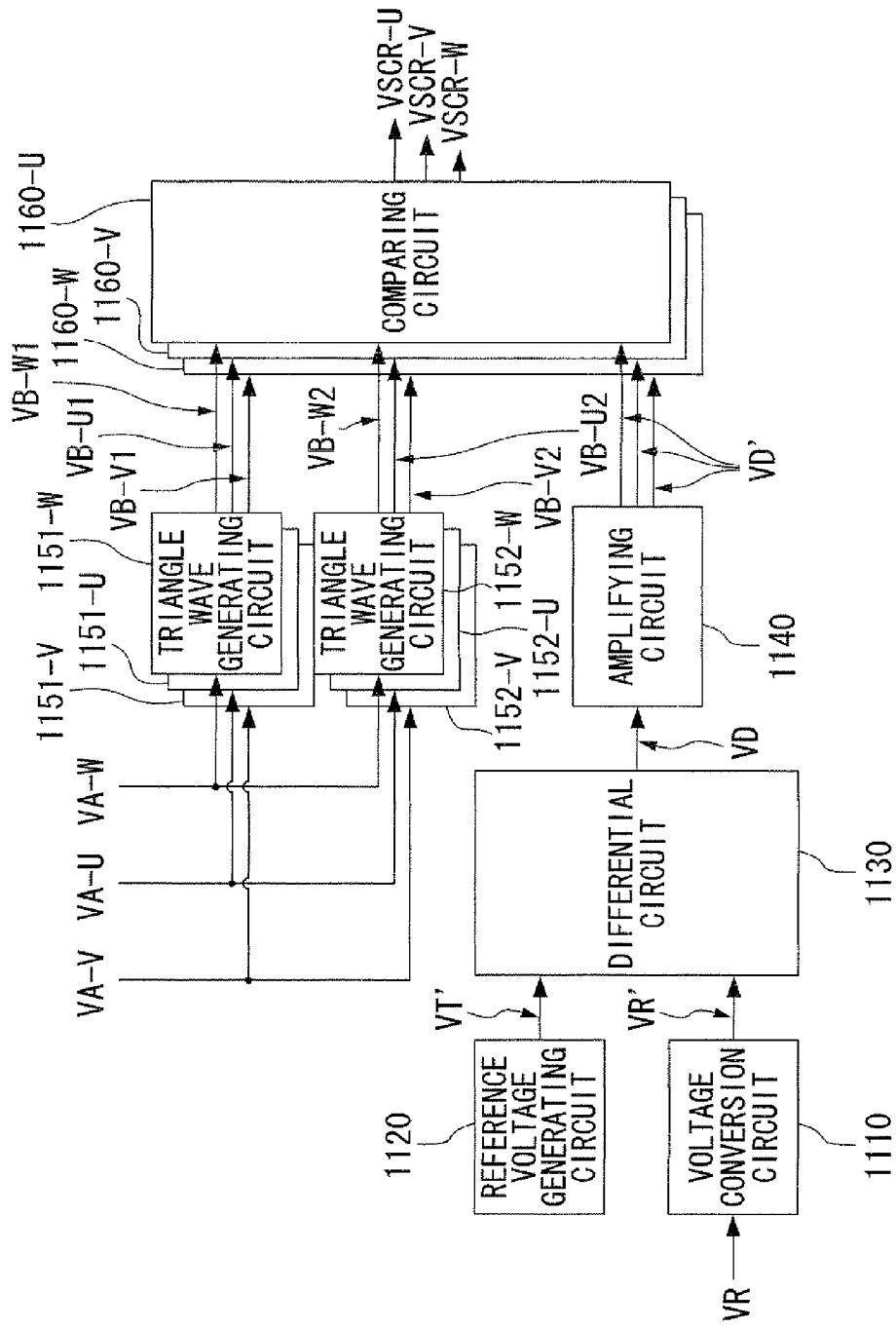
FIG. 30 is a block diagram of a detailed configuration of a gate control unit according to a seventh embodiment of the invention.

FIG. 30 is a detailed configuration of the gate control unit 2152. In FIG. 30, constituent parts which are common to those of the gate control unit 1100 according to the first embodiment (FIG. 2) are designated with like reference numerals.

As shown in FIG. 30, the gate control unit 2152 includes a voltage conversion circuit 1110, a reference voltage generating circuit 1120, a differential circuit 1130, an amplifying circuit 1140, triangle wave generating circuits 1151-W, U, and V, triangle wave generating circuits 1152-W, U, and V, and comparing circuits 1160-U, V, and W.

An AC voltage VA-W which is the W-phase output of the triple-phase alternating generator, an AC voltage VA-U which is the U-phase output, and an AC voltage VA-W which is the V-phase output, are respectively inputted to the triangle wave generating circuits 1151-W, U, and V. Thus a single-phase AC voltage is inputted to each of the triangle wave generating circuits 1151, which generate triangle waves in the manner described in the first embodiment and the sixth embodiment. As a result, when the inputted single-phase AC voltages are in the positive cycle, triangle waves are generated, and outputted from the triangle wave generating circuits 1151 as triangle wave voltages VB-W1, U1, and V1.

An AC voltage VA-W, an AC voltage VA-U, and an AC voltage VA-V are similarly inputted to the triangle wave generating circuits 1152-W, U, and V. Each triangle wave generating circuit 1152 inverts the inputted single-phase AC voltage before generating a triangle wave in the manner described in the first embodiment and the sixth embodiment. As a result, when the inputted single-phase AC voltages are in the negative cycle, triangle waves are generated, and outputted from the triangle wave generating circuits 1152 as triangle wave voltages VB-W2, U2, and V2.

The comparing circuits 1160-U, V, and W respectively receive inputs of triangle wave voltages VB-W1 and W2, VB-U1 and U2, and VB-V1 and V2. They compare each triangle wave voltage VB with the voltage VD', and, based on the result, output pulse signals VSCR-U, V, and W, as will be explained in detailed below while referring to waveform charts.

Figure 31:
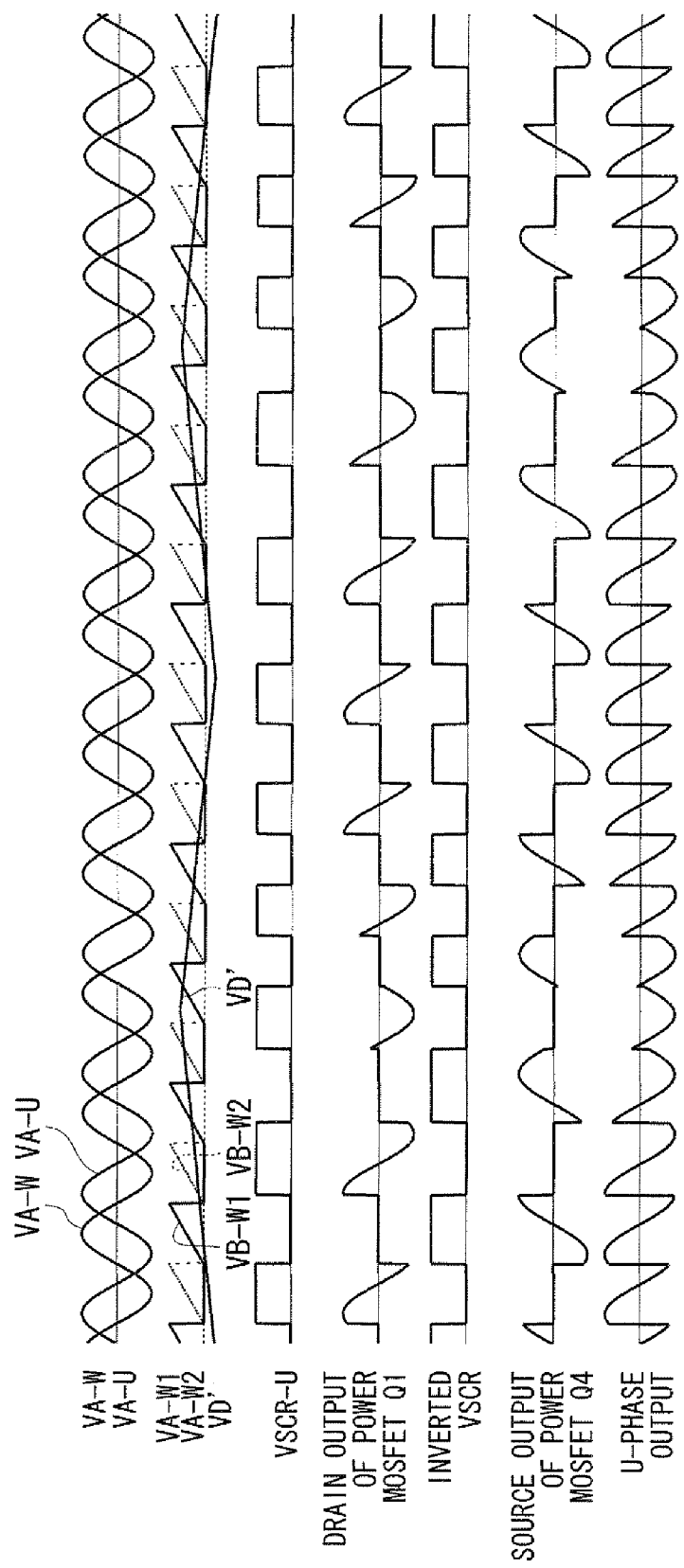
FIG. 31 is a waveform chart for explanation of an operation of a power converter according to the seventh embodiment of the invention.

FIG. 31 is a waveform chart of each voltage and the like. FIG. 31 is an idealized example that does not consider noise and the like; for simplicity, a process of the comparing circuit 1160-U will be explained using this example. As shown in a first stage of FIG. 31, the phase of the AC voltage VA-W is 240 degrees slower than the AC voltage VA-U. The comparing circuit 1160-U compares the triangle wave voltages VB-W1 and W2 that are generated based on this AC voltage VA-W with the differential voltage VD', and, based on the result, generates a pulse signal VSCR. The triangle wave voltages VB-W1 and W2, and the differential voltage VD', are shown in a second stage of FIG. 31.

Specifically, the comparing circuit 1160-U firstly determines whether the voltage VD' has a positive value at the rise of the triangle wave voltage VB-W2 (the timing when the AC voltage VA-W enters a negative cycle). If the voltage VD' is not positive, it switches the pulse signal VSCR-U to the high level while the negative cycle of the AC voltage VA-W continues. On the other hand, if the voltage VD' is positive, it calculates the point of intersection between the hypotenuse of the triangle wave voltage VB-W2 and the voltage VD', and switches the pulse signal VSCR-U to the high level from that point onwards. Subsequently, it calculates a point of intersection between the hypotenuse of the next triangle wave voltage VB-W1 and the voltage VD', and switches the pulse signal VSCR-U to the low level at that point. The third stage of FIG. 31 is an example of a pulse signal VSCR-U generated in this process. The comparing circuit 1160-U thus generates and outputs the pulse signal VSCR-U. The same goes for the comparing circuits 1160-V and W.

Next, voltages applied to both terminals of the battery 300 and the load 303 as a result of these processes of the comparing circuits 1160 will be explained.

The pulse signal VSCR-U outputted from the comparing circuit 1160-U is inputted to the gate of the power MOSFET Q1. The source and drain of the power MOSFET Q1 become conductive only when the pulse signal VSCR-U inputted to its gate is at the high level. Since the AC voltage VA-U is inputted to the source of the power MOSFET Q1, when the pulse signal VSCR-U inputted to the gate is at the high level, the AC voltage VA-U passes the power MOSFET Q1 and is applied to plus terminals of the battery 300 and the load 303. The fourth stage of FIG. 31 represents the AC voltage VA-U applied at this time.

The pulse signal VSCR-U outputted from the comparing circuit 1160-U is inverted by the inverter T1, and inputted to a gate of the power MOSFET Q4. The source and drain of the power MOSFET Q4 become conductive only when the inverted pulse signal VSCR-U inputted to its gate is at the high level. Since the AC voltage VA-U is inputted to the drain of the power MOSFET Q4, when the inverted pulse signal VSCR-U is at the high level, the AC voltage VA-U passes the power MOSFET Q4 and is applied to minus terminals of the battery 300 and the load 303. Fifth and sixth stages of FIG. 31 respectively represent the inverted pulse signal VSCR-U and the applied AC voltage VA-U.

The waveform in a seventh stage of FIG. 31 is the net voltage applied to both terminals of the battery 300 and the load 303, as a result of applying the AC voltage VA-U to the plus terminals and the minus terminals of the battery 300 and the load 303 as described above. This voltage is obtained by adding the AC voltage VA-U applied to the plus terminals and the inverted AC voltage VA-U applied to the minus terminals.

Figure 32:
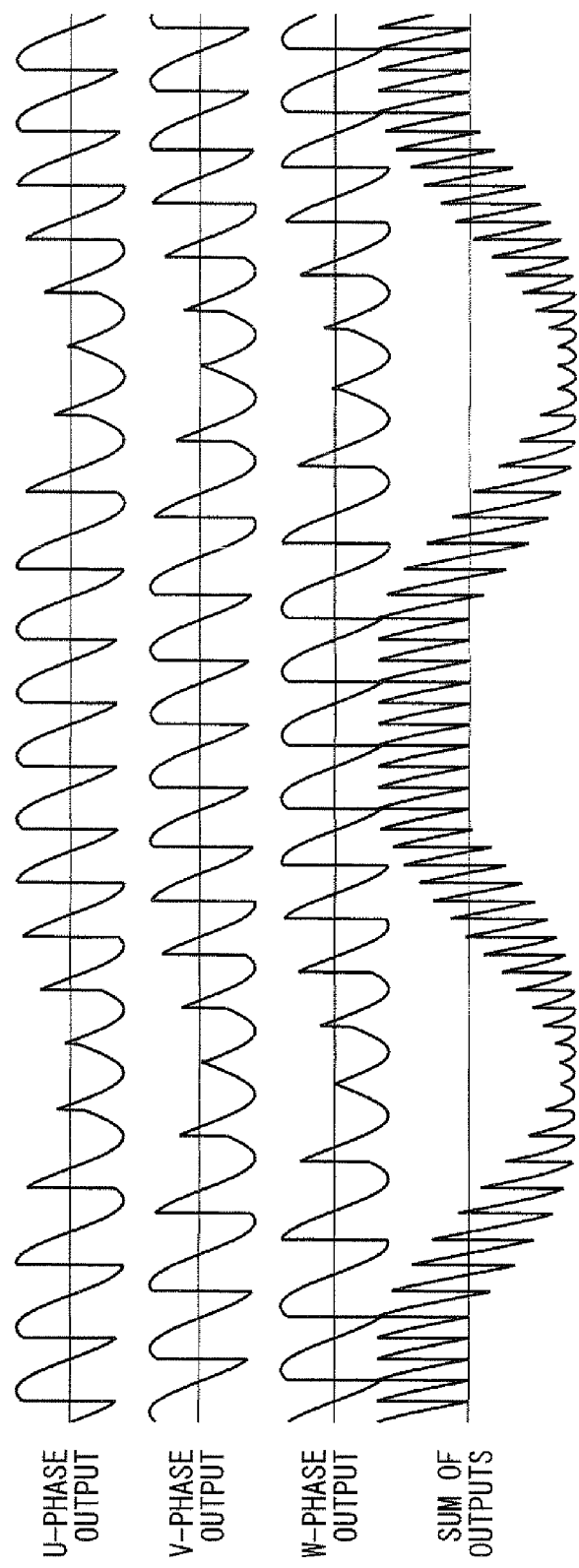
FIG. 32 is a waveform chart for explanation of an operation of a gate control unit according to the seventh embodiment of the invention.

Further, FIG. 32 represents the voltage in each phase applied at both terminals of the battery 300 and the load 303, and the total value. This total value becomes the charge voltage of the battery 300. As shown in FIGS. 31 and 32, as VD' increases, the charge voltage swings to the minus side and the battery 300 starts discharging. When VD' decreases, the total value swings to the plus side and the battery 300 is charged.

These processes can be explained in terms of advance angles and delay angles. The processes of the gate control unit 2152 realize results equivalent to an advance angle process and a delay angle process, as described below.

For example, in regard to the U-phase, when the voltage VD' is comparatively large, the gate control unit 2152 makes the power MOSFET Q1 output negative U-phase voltage. This process is an advance angle process, in that the U-phase output is shifted to the negative side. Consequently, current flows from the battery 300 to the generator, which operates as a motor, and the battery 300 discharges. On the other hand, when the voltage VD' is comparatively small, the gate control unit 2152 makes the power MOSFET Q1 output positive U-phase voltage. This process is a delay angle process, in that the U-phase output is shifted to the positive side. Consequently, current flows from the generator to the battery 300, thereby charging it.

FIG. 33 is an explanatory diagram of advance and delay angles obtained from actual tests. FIG. 33 represents a square wave representing AC voltage VA-U, a pulse signal VSCR-U, and output current to the battery 300 and the load 303. The square wave holds the high level in the positive cycle of the AC voltage VA-U, and holds the low level in the negative cycle. To simplify testing, the example of FIG. 33 differs from the example described above in that the pulse signal VSCR-U is lowered to the low level after a predetermined time elapses since raising it to the high level.

Figure 33A:
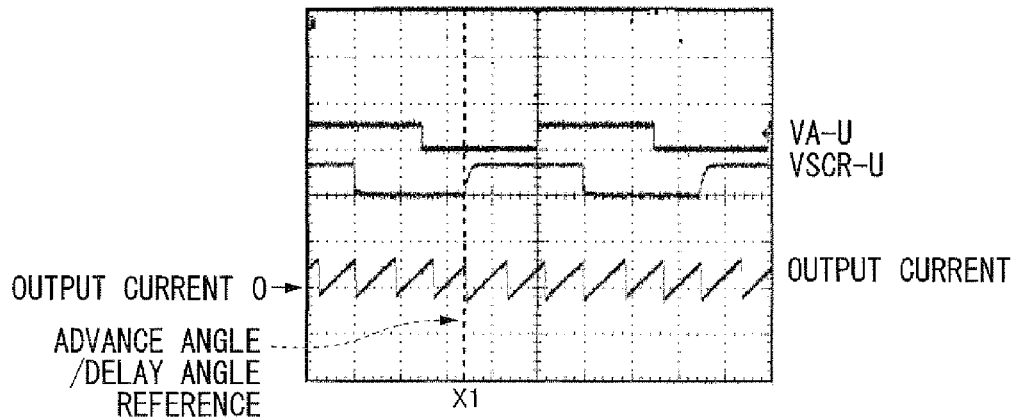
FIG. 33A is a diagram for explanation of advance angles and delay angles according to the seventh embodiment of the invention, being a diagram of results of actual testing.

FIG. 33A is a diagram of reference states for an advance angle and a delay angle, which are arranged for convenience of illustration. Here, the pulse signal VSCR-U is raised to the high level at approximately 7/20 of the time since the start of the negative cycle of the AC voltage VA-U. The output current here is slightly on the plus side. In other words, the battery 300 is in a calm charge state.

Figure 33B:
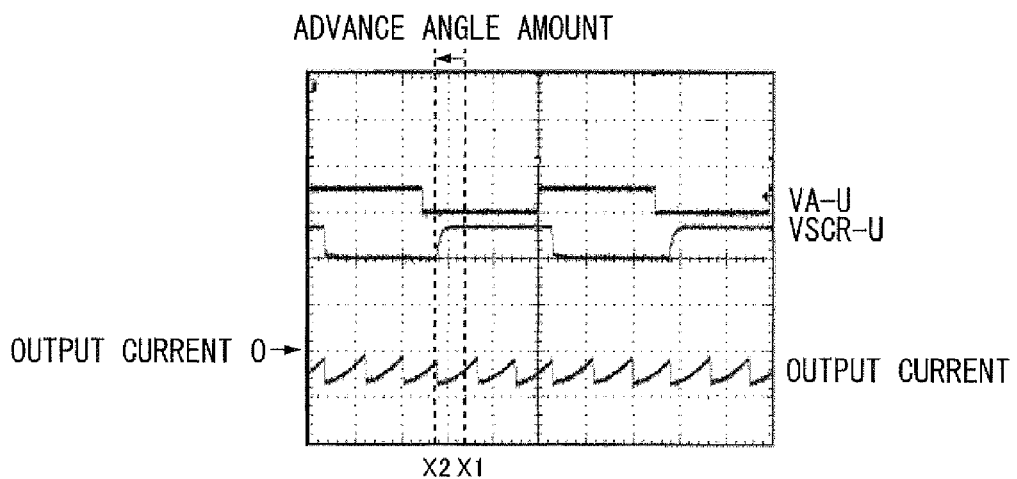
FIG. 33B is a diagram for explanation of advance angles and delay angles according to the seventh embodiment of the invention, being a diagram of results of actual testing.

In contrast in FIG. 33B, the pulse signal VSCR-U is raised to the high level at approximately 2/20 of the time since the start of the negative cycle of the AC voltage VA-U. Since this outputs almost entirely the negative cycle of the AC voltage VA-U, it achieves of a state of performing an advance angle process. As a result, the output current is on the minus side, and the battery 300 is in the discharge state.

Figure 33C:
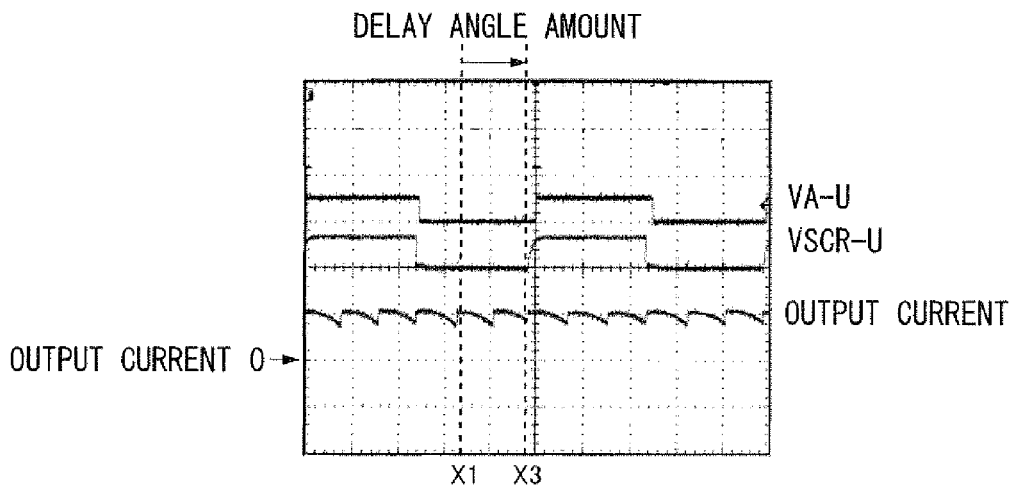
FIG. 33C is a diagram for explanation of advance angles and delay angles according to the seventh embodiment of the invention, being a diagram of results of actual testing.

In FIG. 33C, the pulse signal VSCR-U is raised to the high level at approximately 19/20 of the time since the start of the negative cycle of the AC voltage VA-U. Since this outputs almost entirely the positive cycle of the AC voltage VA-U, it achieves of a state of performing a delay angle process. As a result, the output current is considerably on the plus side, and the battery 300 is in a state of a rapid discharge.

Thus the charge state of the battery 300 can be controlled according to how much of the negative cycle of the AC voltage VA-U is outputted. As shown in FIG. 31, in this embodiment, the extent of the negative cycle output of each phase is controlled according to the size of the voltage VD', obtaining an effect that is equivalent to executing an advance angle process or a delay angle process.

As mentioned earlier, the power converter 1000 can also be applied in a circuit that performs triple-phase full-wave rectification. In each phase, the AC voltage power output timing from each power MOSFET is controlled based on an AC voltage having a phase shifted by 240 degrees, thereby creating states of advance angle and delay angle control, and making it possible to control the charge/discharge states of the battery 300.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

The invention claimed is:

1. A power converter that converts an AC power outputted from a generator into a DC power and supplies it to a load, comprising:
    a switch unit connected between an output unit of the generator and the load; and
    a control unit that controls the conductive state of the switch unit;
    the control unit including:
    a triangle wave generating circuit that generates a triangle wave voltage having a constant peak voltage corresponding to each cycle of the AC power outputted from the generator, using a waveform of an AC voltage of an immediately preceding cycle;
    a differential circuit that inputs a voltage expressing an effective value or an average value of the voltage supplied via the switch unit to the load, and a predetermined target voltage, and generates a differential voltage between them; and
    a comparing circuit that compares the triangle wave voltage and the differential voltage generated by the differential circuit, generates a pulse signal that stipulates a conductive timing of the switch unit based on the comparison result, and controls the conductive state of the switch unit.

2. The power converter according to claim 1, wherein the control unit comprises
    a voltage generating circuit that generates a predetermined voltage; and
    a selection circuit that, based on the size relationship between a predetermined voltage generated by the voltage generating circuit and a differential voltage generated by the differential circuit, selects one of the predetermined voltage and the differential voltage, and outputs it to the comparing circuit;
    and the comparing circuit compares the predetermined voltage or the differential voltage inputted from the selection circuit with the triangle wave voltage, and, based on the comparison result, generates a pulse signal that stipulates a conduction timing of the switch unit, and supplies it to the switch unit.

3. The power converter according to claim 2, wherein the control unit comprises a counter circuit that counts a clock, and, when the count result exceeds a threshold, controls the output of the selection circuit such that it outputs the differential voltage generated by the differential circuit.

4. The power converter according to claim 2, wherein the voltage generating circuit includes a CR circuit including a capacitor and a resistor, and generates the predetermined voltage by discharging a charge stored in the capacitor.

5. The power converter according to claim 2, wherein the control unit comprises a load removal detection circuit that detects a removal of the load based on the AC voltage outputted from the generator and the output of the switch unit, and, when it detects that the load has been removed, controls the output of the selection unit such that it outputs the predetermined voltage generated by the voltage generating circuit.

6. The power converter according to claim 1, wherein the control unit comprises a load removal detection circuit that detects a removal of the load based on the AC voltage outputted from the generator and the output of the switch unit, and, when it detects that the load has been removed, performs a process for reducing the voltage value of the predetermined target voltage.

7. The power converter according to claim 1, further comprising an amplifying circuit that amplifies the differential voltage and supplies it to the comparing circuit.

8. The power converter according to claim 7, where, if H is the wave height value of the triangle wave, M is the amplification rate of the amplifying circuit, VT is the target voltage, and W is the control width of the voltage supplied via the switch unit to the load, then W is a value within a range from VT to VT+(H/M).

9. The power converter according to claim 1, wherein the triangle wave generation unit includes
    a count unit that counts the time of a half-cycle of an AC voltage VA in a first cycle outputted by the generator;
    a division unit that divides a count number of the count unit by a predetermined value; and
    a waveform generation unit that, in a second cycle after the first cycle, generates a step voltage waveform that rises by the predetermined voltage at each elapse of a time indicated by the division result obtained from the division unit in the first cycle;
    the power converter outputting the step voltage waveform as a waveform of the triangle wave voltage.

10. The power converter according to claim 1, wherein the triangle wave generation unit further includes
    a first charge unit that charges a first capacitor with a constant current having a predetermined current value, while the AC voltage outputted from the generator is in a positive cycle or a negative cycle; and
    a second charge unit that charges a second capacitor with a constant current having a current value based on a voltage between the terminals of the first capacitor when the cycle ends;
    and thereby terminates charging of the second charge unit, based on the AC voltage cycle and the voltage between the terminals of the second capacitor; and
    outputs the voltage between the terminals of the second capacitor as a waveform of the triangle wave voltage.

11. A power converter that converts a triple-phase AC power outputted from a generator into a DC power and supplies it to a load, comprising:
    a plurality of switch units connected between each phase output unit of the generator and each terminal of the load; and
    a control unit for generating a triangle wave voltage corresponding to each cycle of the AC power in each phase outputted from the generator and having a constant peak voltage, generating a differential voltage between the voltage supplied to the load via the switch unit and a predetermined target voltage, and, in each phase, controlling the conductive state of each switch unit connected to that phase output unit, based on the triangle wave voltages generated for other phases and the differential voltage.

12. The power converter according to claim 11, wherein the control unit generates a W-phase triangle wave voltage corresponding to each cycle of a W-phase AC power outputted from the generator and having a constant peak voltage, generating a differential voltage between the voltage supplied to the load via the switch unit and a predetermined target voltage, and, in each phase, controlling the conductive state of each switch unit connected to a U-phase output unit, based on the generated W-phase triangle wave voltages and the differential voltage;

generates a U-phase triangle wave voltage corresponding to each cycle of a U-phase AC power outputted from the generator and having a constant peak voltage, generating a differential voltage between the voltage supplied to the load via the switch unit and a predetermined target voltage, and, in each phase, controlling the conductive state of each switch unit connected to a V-phase output unit, based on the generated U-phase triangle wave voltages and the differential voltage; and generates a V-phase triangle wave voltage corresponding to each cycle of a V-phase AC power outputted from the generator and having a constant peak voltage, generating a differential voltage between the voltage supplied to the load via the switch unit and a predetermined target voltage, and, in each phase, controlling the conductive state of each switch unit connected to a W-phase output unit, based on the generated V-phase triangle wave voltages and the differential voltage.

13. A triangle wave generating circuit that generates a triangle wave voltage for controlling the conductive state of a switch element in a power converter that converts an AC power outputted from a generator into a DC power and supplies it to a load, comprising:

a first charge unit that charges a first capacitor with a constant current having a predetermined current value, while the AC voltage outputted from the generator is in a positive cycle or a negative cycle;

a second charge unit that charges a second capacitor with a constant current having a current value based on a voltage between the terminals of the first capacitor when the cycle ends; and a control unit that terminates charging of the second charge unit, based on the AC voltage cycle and the voltage between the terminals of the second capacitor;

the triangle wave generating circuit outputting the voltage between the terminals of the second capacitor as a waveform of the triangle wave voltage.

* * * * *